United States Patent
Wu

(10) Patent No.: US 9,101,003 B2
(45) Date of Patent: Aug. 4, 2015

(54) WIRELESS INTELLIGENT LAMP CONTROL METHOD AND SYSTEM, WALL SWITCH BASE, AND REMOTE SWITCH HANDSET

(75) Inventor: Chih-Yen Wu, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 720 days.

(21) Appl. No.: 13/470,460

(22) Filed: May 14, 2012

(65) Prior Publication Data
US 2013/0082605 A1    Apr. 4, 2013

(30) Foreign Application Priority Data

Sep. 29, 2011    (CN) .......................... 2011 1 0303944
Sep. 29, 2011    (TW) .............................. 100135264 A

(51) Int. Cl.
*H05B 37/04*    (2006.01)
*H05B 37/02*    (2006.01)

(52) U.S. Cl.
CPC ............. *H05B 37/0272* (2013.01); *Y02B 20/48* (2013.01)

(58) Field of Classification Search
None
See application file for complete search history.

(56) References Cited

U.S. PATENT DOCUMENTS

2010/0312366 A1*    12/2010    Madonna et al. ............... 700/90

* cited by examiner

*Primary Examiner* — Cassandra Cox
(74) *Attorney, Agent, or Firm* — Rosenberg, Klein & Lee

(57) ABSTRACT

A wireless intelligent lamp control method is to be implemented by a remote switch handset for wireless communication with a wall switch base, and includes: receiving an ON signal set including at least one ON signal sent from a user-selected command key unit, and determining at least one of a number and a duration of the at least one ON signal; transmitting a wireless signal indicating the user-selected command key unit to the wall switch base for establishing a matching relation when the ON signal set includes only one ON signal and the duration thereof is longer than an ON threshold time; and wirelessly receiving the matching relation from the wall switch base, and storing the matching relation.

25 Claims, 7 Drawing Sheets

WIRELESS INTELLIGENT LAMP CONTROL METHOD AND SYSTEM, WALL SWITCH BASE, AND REMOTE SWITCH HANDSET

CROSS-REFERENCE TO RELATED APPLICATION

This application claims priority of Chinese Application No. 2011103039442, filed on Sep. 29, 2011.

BACKGROUND OF THE INVENTION

1. Field of the Invention

The present invention relates to a method and a system, a base, and a handset, more particularly to a wireless intelligent lamp control method and system, a wall switch base, and a remote switch handset.

2. Description of the Related Art

Referring to FIG. 1, a conventional wireless intelligent lamp control system includes an electric lamp 53 and an intelligent switch device 5.

The intelligent switch device 5 includes a remote switch handset 52, and a wall switch base 51. The remote switch handset 52 may be portable or stationary, and includes a switch key 522 and a wireless transmitter 521. The switch key 522 is operable to transmit a trigger signal.

The wireless transmitter 521 is coupled electrically to the switch key 522 for receiving the trigger signal, and wirelessly transmits a modulated signal according to the trigger signal.

The wall switch base 51 is mounted on a wall surface of a stationary object (such as a wall or a board surface of a cabinet) and is coupled electrically between the electric lamp 53 and an AC power source that provides an AC power signal. The wall switch base 51 includes an AC/DC converter 510, a wireless receiver 511, a mechanical toggle key 512, and a switch 513.

The AC/DC converter 510 is coupled electrically to the AC power source for receiving the AC power signal and generating a DC power signal.

The switch 513 is coupled electrically to the AC/DC converter 510 for receiving the DC power signal, and is coupled electrically to the electric lamp 53. The switch 513 is controllable to switch between ON and OFF states for allowing and interrupting a flow of the DC power signal to the electric lamp 53, so as to turn on and turn off the electric lamp 53.

The wireless receiver 511 is coupled electrically to the switch 513, receives the modulated signal, and controls the switch 513 to switch between the ON and OFF states according to the modulated signal.

The mechanical toggle key 512 is coupled electrically to the switch 513, and is user-operable to switch between ON and OFF positions for controlling the switch 513 to switch between the ON and OFF states.

The aforementioned conventional wireless intelligent lamp control system has the following disadvantages:

1. The mechanical toggle key 512 remains at the ON position when a user directly operates the mechanical toggle key 512 to switch to the ON position for turning ON the electric lamp 53, and subsequently uses the remote switch handset 52 to wirelessly transmit the modulated signal for controlling the wall switch base 51 to turn off the electric lamp 53.

When the user (may be the same user or another user) intends to directly use the wall switch base 51 for turning on the electric lamp 53 next time, the user may find a mismatch predicament that the mechanical toggle key 512 is at the ON position but the electric lamp 53 is turned off as a result of the remote switch handset 52 being previously used for controlling the wall switch base 51 to turn off the electric lamp 53. Under this situation, there are two ways for turning on the electric lamp 53:

First, the user needs to operate the mechanical toggle key 512 to switch from the ON position to the OFF position and to switch back to the ON position again so as to turn on the electric lamp 53; and Second, the user alternatively operates the remote switch handset 52 to control the wall switch base 51 for turning on the electric lamp 53.

The aforementioned situation may cause user inconvenience, especially to a family with a lot of family members and guests.

2. In the conventional wireless intelligent lamp control system, the remote switch handset 52 has a fixed correspondence with the wall switch base 51. That is, the remote switch handset 52 is merely able to control a single switch 513 of the electric lamp 53 and may not be modified with other matching relations according to the user's preference or environmental requirements, such that flexibility of the conventional wireless intelligent lamp control system is relatively limited.

SUMMARY OF THE INVENTION

Therefore, in a first aspect of the present invention, a wireless intelligent lamp control method that offers greater flexibility is provided.

The wireless intelligent lamp control method is to be implemented by a wireless intelligent lamp control system. The wireless intelligent lamp control system includes a wall switch base and a remote switch handset. The wall switch base includes a plurality of two-state switch keys and a base microprocessor unit. The remote switch handset includes a plurality of command key units and a handset microprocessor unit that includes a handset memory. Each of the command key units includes an ON key. The wireless intelligent lamp control method comprises: (A) configuring the handset microprocessor unit to receive an ON signal set including at least one ON signal sent from the ON key of a user-selected one of the command key units, and to determine at least one of a number and a duration of the at least one ON signal in the ON signal set; (B) configuring the handset microprocessor unit to transmit a wireless signal indicating the user-selected one of the command key units when the handset microprocessor unit determines that the ON signal set includes only one ON signal and the duration of the ON signal is longer than an ON threshold time; (C) configuring the base microprocessor unit to receive a trigger signal set including at least one trigger signal sent from a user-selected one of the two-state switch keys, and to determine at least one of a number and a duration of the at least one trigger signal in the trigger signal set; (D) configuring the base microprocessor unit to receive the wireless signal wirelessly transmitted by the handset microprocessor unit and indicating the user-selected one of the command key units, and to establish a matching relation between the user-selected one of the two-state switch keys and the user-selected one of the command key units when the base microprocessor unit determines that the trigger signal set includes only one trigger signal and the duration of the trigger signal is longer than a trigger threshold time; (E) configuring the base microprocessor unit to wirelessly transmit the matching relation established in step (D); and (F) configuring the handset microprocessor unit to receive the matching relation wirelessly transmitted by the base microprocessor unit in step (E), and to store the matching relation in the handset memory.

Preferably, each of the two-state switch keys includes a status indicator. The wireless intelligent lamp control method further comprises the following step after step (C): configuring the base microprocessor unit to control the status indicator of the user-selected one of the two-state switch keys to indicate that the user-selected one of the two-state switch keys is undergoing matching.

Preferably, the wall switch base further includes a plurality of switches each controllable to operate in a switch state. The base microprocessor unit includes a base memory that stores corresponding relations between the two-state switch keys and the switches, and the switch state of each of the switches. Each of the two-state switch keys includes a status indicator. The wireless intelligent lamp control method further comprises the following step after step (F): configuring the base microprocessor unit to control the status indicator of the user-selected one of the two-state switch keys to indicate the switch state of a corresponding one of the switches corresponding to the user-selected one of the two-state switch keys according to the corresponding relations and the switch states stored in the base memory.

Preferably, the wall switch base further includes a plurality of switches each controllable to operate in a switch state. The base microprocessor unit includes a base memory that stores corresponding relations between the two-state switch keys and the switches, and the switch state of each of the switches. Each of the switch keys includes a status indicator. In step (C), the base microprocessor unit is further configured to determine an interval between two consecutive trigger signals in the trigger signal set. The wireless intelligent lamp control method further comprises: (G) configuring the base microprocessor unit to control the status indicator of the user-selected one of the two-state switch keys to indicate that the user-selected one of the two-state switch keys is undergoing matching when the base microprocessor unit determines that the trigger signal set includes two consecutive trigger signals, that the duration of each of the two consecutive trigger signals is shorter than the trigger threshold time, and that the interval between the two consecutive trigger signals is shorter than a predetermined time interval in step (C); (H) configuring the base microprocessor unit to determine whether another trigger signal set, which includes two consecutive trigger signals each having the duration shorter than the trigger threshold time and the interval between the two consecutive trigger signals being shorter than the predetermined time interval, is received from another user-selected one of the two-state switch keys, and if affirmative, configuring the base microprocessor unit to control the status indicator of said another user-selected one of the two-state switch keys to indicate that said another user-selected one of the two-state switch keys is undergoing matching; (I) configuring the base microprocessor unit to receive the wireless signal wirelessly transmitted by the handset microprocessor unit and indicating the user-selected one of the command key units of the remote switch handset, and to establish the matching relation between the user-selected one of the command key units and each user-selected one of the two-state switch keys when the base microprocessor unit determines that said another trigger signal set is not received in step (H); (J) configuring the base microprocessor unit to wirelessly transmit the matching relation established in step (I) to the handset microprocessor unit for storage in the handset memory; and (K) configuring the base microprocessor unit to control the status indicator of each user-selected one of the two-state switch keys to indicate the switch state of a corresponding one of the switches corresponding thereto according to the corresponding relations and the switch states stored in the base memory.

Preferably, the wireless intelligent lamp control system further includes a plurality of electric lamps. The wall switch base further includes a plurality of switches each controllable to operate in a switch state. Each of the switches is configured to receive a direct current (DC) power signal and is coupled electrically to a corresponding one of the electric lamps. The base microprocessor unit includes a base memory that stores corresponding relations between the two-state switch keys and the switches, and the switch state of each of the switches. Each of the two-state switch keys includes a status indicator. The wireless intelligent lamp control method further comprises: configuring the base microprocessor unit to determine a corresponding one of the switches that corresponds to the user-selected one of the two-state switch keys according to the corresponding relations stored in the base memory, and to change the switch state of the corresponding one of the switches stored in the base memory when the base microprocessor unit determines that the trigger signal set includes only one trigger signal and that the duration of the trigger signal is shorter than the trigger threshold time in step (C); configuring the base microprocessor unit to control the status indicator of the user-selected one of the two-state switch keys to indicate the switch state of the corresponding one of the switches stored in the base memory; and configuring the base microprocessor unit to control the corresponding one of the switches corresponding to the user-selected one of the two-state switch keys to operate according to the switch state stored in the base memory, such that when the switch state stored in the base memory is an ON state, the base microprocessor unit controls the corresponding one of the switches to operate in the ON state for allowing transmission of the DC power signal to the corresponding one of the electric lamps, and such that when the switch state stored in the base memory is an OFF state, the base microprocessor unit controls the corresponding one of the switches to operate in the OFF state for interrupting transmission of the DC power signal to the corresponding one of the electric lamps.

Preferably, the wireless intelligent lamp control system further includes a plurality of electric lamps. The wall switch base further includes a plurality of switches each controllable to operate in a switch state. Each of the switches is configured to receive a direct current (DC) power signal and is coupled electrically to a corresponding one of the electric lamps. The base microprocessor unit includes a base memory that stores corresponding relations between the two-state switch keys and the switches, and the switch state of each of the switches. Each of the two-state switch keys includes a status indicator. Each of the command key units of the remote switch handset further includes an OFF key operable to send an OFF signal. The wireless intelligent lamp control method further comprises: configuring the base microprocessor unit to wirelessly receive from the handset microprocessor unit a control signal that indicates a signal sent from the user-selected one of the command key units of the remote switch handset and that indicates at least one of the two-state switch keys corresponding to the user-selected one of the command key units; configuring the base microprocessor unit to determine at least one of the switches corresponding to the at least one of the two-state switch keys according to the control signal and the corresponding relations stored in the base memory, and to change the switch state of the at least one of the switches stored in the base memory according to the control signal, such that the switch state stored in the base memory and corresponding to the at least one of the switches is set to an ON state when the control signal indicates the signal sent from the user-selected one of the command key units is the ON signal, and is set to an OFF state when the control signal indicates the signal sent from the user-selected one of the command key units is the OFF signal; configuring the base microprocessor unit to control the status indicator of the at least one of the two-state switch keys corresponding to the user-selected one of the command key units for indicating the switch state of the at least one of the switches, corresponding to the at least one of the two-state switch keys, stored in the base memory; and configuring the base microprocessor unit to control the at least one of the switches corresponding to the at least one of the two-state switch keys to operate according to the switch state stored in the base memory, such that when the switch state stored in the base memory is the ON state, the base microprocessor unit controls the at least one of the switches to operate in the ON state for allowing transmission of the DC power signal to the corresponding one of the electric lamps, and such that when the switch state stored in the base memory is the OFF state, the base microprocessor unit controls the at least one of the switches to operate in the OFF state for interrupting transmission of the DC power signal to the corresponding one of the electric lamps.

Preferably, the wireless intelligent lamp control system further includes a plurality of electric lamps corresponding respectively to the two-state switch keys. The wall switch base further includes a plurality of switches each controllable to operate in a switch state and is coupled electrically to a corresponding one of the electric lamps. The base microprocessor unit includes a base memory that stores corresponding relations between the two-state switch keys and the switches, and the switch state of each of the switches. Each of the two-state switch keys includes a status indicator. The handset memory of the handset microprocessor unit stores matching data associated with the matching relations between the plurality of two-state switch keys and the plurality of command key units. The wireless intelligent lamp control method further comprises: (M1) configuring the handset microprocessor unit to inspect the matching data stored in the handset memory for making a determination as to whether there is any matching relation associated with the user-selected one of the command key units when the handset microprocessor unit determines in step (A) that the ON signal set includes only one ON signal and the duration of the ON signal is shorter than the ON threshold time; (M2) configuring the handset microprocessor unit to wirelessly transmit a control signal that indicates the ON signal sent from the user-selected one of the command key units of the remote switch handset and that indicates at least one of the two-state switch keys corresponding to the user-selected one of the command key units according to the matching relations when a result of the determination made in step (M1) is affirmative; (M3) configuring the base microprocessor unit to receive the control signal wirelessly transmitted by the handset microprocessor unit, to determine at least one of the switches corresponding to the at least one of the two-state switch keys according to the control signal and the corresponding relations stored in the base memory, and to set the switch state of the at least one of the switches stored in the base memory to an ON state according to the control signal; (M4) configuring the base microprocessor unit to control the status indicator of the at least one of the two-state switch keys for indicating the switch state of the at least one of the switches, corresponding to the at least one of the two-state switch keys, stored in the base memory; and (M5) configuring the base microprocessor unit to control the at least one of the switches to operate according to the switch state stored in the base memory so as to turn on the electric lamp corresponding to the user-selected one of the command key units.

An advantage of the first aspect of the present invention resides in providing the innovative wireless intelligent lamp control method capable of establishing the matching relations between the two-state switch keys and the command key units so as to achieve greater flexibility.

In a second aspect of the present invention, a wireless intelligent lamp control system that offers greater flexibility is provided.

The wireless intelligent lamp control system comprises an intelligent switch apparatus that includes a remote switch handset and a wall switch base. The remote switch handset includes a plurality of command key units and a handset microprocessor unit. Each of the command key units includes an ON key. The ON key of a user-selected one of the command key units is operable to send an ON signal set that includes at least one ON signal. The handset microprocessor unit includes a handset memory and is coupled electrically to each of the command key units. The handset microprocessor unit is configured: to receive the ON signal set including the at least one ON signal sent from the ON key of the user-selected one of the command key units, and to determine at least one of a number and a duration of the at least one ON signal in the ON signal set; and to transmit a wireless signal indicating the user-selected one of the command key units when the handset microprocessor unit determines that the ON signal set includes only one ON signal and the duration of the ON signal is longer than an ON threshold time. The wall switch base includes a plurality of two-state switch keys and a base microprocessor unit. A user-selected one of the two-state switch keys is operable to send a trigger signal set that includes at least one trigger signal. The base microprocessor unit is coupled electrically to each of the two-state switch keys. The base microprocessor unit is configured: to receive the trigger signal set including the at least one trigger signal sent from the user-selected one of the two-state switch keys, and to determine at least one of a number and a duration of the at least one trigger signal in the trigger signal set; to receive the wireless signal wirelessly transmitted by the handset microprocessor unit and indicating the user-selected one of the command key units, and to establish a matching relation between the user-selected one of the two-state switch keys and the user-selected one of the command key units when the base microprocessor unit determines that the trigger signal set includes only one trigger signal and the duration of the trigger signal is longer than a trigger threshold time; and to wirelessly transmit the matching relation. The handset microprocessor unit is further configured to receive the matching relation wirelessly transmitted by the base microprocessor unit, and to store the matching relation in the handset memory.

Preferably, the wireless intelligent lamp control system further comprises a plurality of electric lamps. The wall switch base further includes a plurality of switches each controllable to operate in a switch state. Each of the switches is configured to receive a direct current (DC) power signal and is coupled electrically to a corresponding one of the electric lamps. The base microprocessor unit includes a base memory that stores corresponding relations between the two-state switch keys and the switches, and the switch state of each of the switches. Each of the two-state switch keys includes a status indicator. The base microprocessor unit is further configured: to determine a corresponding one of the switches that corresponds to the user-selected one of the switch keys according to the corresponding relations stored in the base memory, and to change the switch state of the corresponding one of the switches stored in the base memory when the base microprocessor unit determines that the trigger signal set includes only one trigger signal and that the duration of the trigger signal is shorter than the trigger threshold time; to control the status indicator of the user-selected one of the two-state switch keys to indicate the switch state of the corresponding one of the switches stored in the base memory; and to control the corresponding one of the switches corresponding to the user-selected one of the two-state switch keys to operate according to the switch state stored in the base memory, such that when the switch state stored in the base memory is an ON state, the base microprocessor unit controls the corresponding one of the switches to operate in the ON state for allowing transmission of the DC power signal to the corresponding one of the electric lamps, and such that when the switch state stored in the base memory is an OFF state, the base microprocessor unit controls the corresponding one of the switches to operate in the OFF state for interrupting transmission of the DC power signal to the corresponding one of the electric lamps.

Preferably, each of the status indicators includes a light-emitting diode (LED). The base microprocessor unit turns off the LED of the status indicator of the user-selected one of the two-state switch keys when the switch state of the corresponding one of the switches stored in the base memory is the ON state, and turns on the LED of the status indicator of the user-selected one of the two-state switch keys when the switch state of the corresponding one of the switches stored in the base memory is the OFF state.

Preferably, the remote switch handset further includes a battery that is coupled electrically to the handset microprocessor unit and that provides electric power thereto.

An advantage of the second aspect of the present invention resides in providing the innovative wireless intelligent lamp control system whose purposes are expanded by establishing the matching relations between the two-state switch keys and the command key units.

In a third aspect of the present invention, a wireless intelligent lamp control method that offers greater flexibility is provided. The wireless intelligent lamp control method is to be implemented by a wall switch base for wireless communication with a remote switch handset. The wall switch base includes a plurality of two-state switch keys and a base microprocessor unit. The remote switch handset includes a plurality of command key units and a handset microprocessor unit. The handset microprocessor unit is configured to transmit a wireless signal indicating a user-selected one of the command key units of the remote switch handset. The wireless intelligent lamp control method comprises: (A) configuring the base microprocessor unit to receive a trigger signal set including at least one trigger signal sent from a user-selected one of the two-state switch keys, and to determine at least one of a number and a duration of the at least one trigger signal in the trigger signal set; (B) configuring the base microprocessor unit to receive the wireless signal wirelessly transmitted by the handset microprocessor unit and indicating the user-selected one of the command key units, and to establish a matching relation between the user-selected one of the two-state switch keys and the user-selected one of the command key units when the base microprocessor unit determines that the trigger signal set includes only one trigger signal and the duration of the trigger signal is longer than a trigger threshold time; and (C) configuring the base microprocessor unit to wirelessly transmit the matching relation to the handset microprocessor unit.

Preferably, each of the two-state switch keys includes a status indicator. The wireless intelligent lamp control method further comprises the following step after step (A): configuring the base microprocessor unit to control the status indicator of the user-selected one of the two-state switch keys to indicate that the user-selected one of the two-state switch keys is undergoing matching.

Preferably, the wall switch base further includes a plurality of switches each controllable to operate in a switch state. The base microprocessor unit includes a base memory that stores corresponding relations between the two-state switch keys and the switches, and the switch state of each of the switches. Each of the two-state switch keys includes a status indicator. The wireless intelligent lamp control method further comprises the following step after step (C): configuring the base microprocessor unit to control the status indicator of the user-selected one of the two-state switch keys to indicate the switch state of a corresponding one of the switches corresponding to the user-selected one of the two-state switch keys according to the corresponding relations and the switch states stored in the base memory.

Preferably, the wall switch base further includes a plurality of switches each controllable to operate in a switch state. The base microprocessor unit includes a base memory that stores corresponding relations between the two-state switch keys and the switches, and the switch state of each of the switches. Each of the switch keys includes a status indicator. The base microprocessor unit is further configured, in step (A), to determine an interval between two consecutive trigger signals in the trigger signal set. The wireless intelligent lamp control method further comprises: (D) configuring the base microprocessor unit to control the status indicator of the user-selected one of the two-state switch keys to indicate that the user-selected one of the two-state switch keys is undergoing matching when the base microprocessor unit determines that the trigger signal set includes two consecutive trigger signals, that the duration of each of the two consecutive trigger signals is shorter than the trigger threshold time, and that the interval between the two consecutive trigger signals is shorter than a predetermined time interval in step (A); (E) configuring the base microprocessor unit to determine whether another trigger signal set, which includes two consecutive trigger signals each having the duration shorter than the trigger threshold time and the interval between the two consecutive trigger signals being shorter than the predetermined time interval, is received from another user-selected one of the two-state switch keys, and if affirmative, configuring the base microprocessor unit to control the status indicator of said another user-selected one of the two-state switch keys to indicate that said another user-selected one of the two-state switch keys is undergoing matching; (F) configuring the base microprocessor unit to receive the wireless signal wirelessly transmitted by the handset microprocessor unit and indicating the user-selected one of the command key units of the remote switch handset, and to establish the matching relation between the user-selected one of the command key units and each user-selected one of the two-state switch keys when the base microprocessor unit determines that said another trigger signal set is not received in step (E); (G) configuring the base microprocessor unit to wirelessly transmit the matching relation established in step (F) to the handset microprocessor unit; and (H) configuring the base microprocessor unit to control the status indicator of each user-selected one of the two-state switch keys to indicate the switch state of a corresponding one of the switches corresponding thereto according to the corresponding relations and the switch states stored in the base memory.

Preferably, the wall switch base is coupled electrically to a plurality of electric lamps. The wall switch base further includes a plurality of switches each controllable to operate in a switch state. Each of the switches is configured to receive a direct current (DC) power signal and is coupled electrically to a corresponding one of the electric lamps. The base microprocessor unit includes a base memory that stores corresponding relations between the two-state switch keys and the switches, and the switch state of each of the switches. Each of the two-state switch keys includes a status indicator. The wireless intelligent lamp control method further comprises: configuring the base microprocessor unit to determine a corresponding one of the switches that corresponds to the user-selected one of the two-state switch keys according to the corresponding relations stored in the base memory, and to change the switch state of the corresponding one of the switches stored in the base memory when the base microprocessor unit determines that the trigger signal set includes only one trigger signal and that the duration of the trigger signal is shorter than the trigger threshold time in step (A); configuring the base microprocessor unit to control the status indicator of the user-selected one of the two-state switch keys to indicate the switch state of the corresponding one of the switches stored in the base memory; and configuring the base microprocessor unit to control the corresponding one of the switches corresponding to the user-selected one of the two-state switch keys to operate according to the switch state stored in the base memory, such that when the switch state stored in the base memory is an ON state, the base microprocessor unit controls the corresponding one of the switches to operate in the ON state for allowing transmission of the DC power signal to the corresponding one of the electric lamps, and such that when the switch state stored in the base memory is an OFF state, the base microprocessor unit controls the corresponding one of the switches to operate in the OFF state for interrupting transmission of the DC power signal to the corresponding one of the electric lamps.

Preferably, the wall switch base is coupled electrically to a plurality of electric lamps. The wall switch base further includes a plurality of switches each controllable to operate in a switch state. Each of the switches is configured to receive a direct current (DC) power signal and is coupled electrically to a corresponding one of the electric lamps. The base microprocessor unit includes a base memory that stores corresponding relations between the two-state switch keys and the switches, and the switch state of each of the switches. Each of the two-state switch keys includes a status indicator. Each of the command key units of the remote switch handset further includes an ON key operable to send an ON signal, and an OFF key operable to send an OFF signal. The wireless intelligent lamp control method further comprises: configuring the base microprocessor unit to wirelessly receive from the handset microprocessor unit a control signal that indicates a signal sent from the user-selected one of the command key units of the remote switch handset and that indicates at least one of the two-state switch keys corresponding to the user-selected one of the command key units; configuring the base microprocessor unit to determine at least one of the switches corresponding to the at least one of the two-state switch keys according to the control signal and the corresponding relations stored in the base memory, and to change the switch state of the at least one of the switches stored in the base memory according to the control signal, wherein the base microprocessor unit sets the switch state stored in the base memory and corresponding to the at least one of the switches to an ON state when the control signal indicates the signal sent from the user-selected one of the command key units is the ON signal, and sets the switch state stored in the base memory and corresponding to the at least one of the switches to an OFF state when the control signal indicates the signal sent from the user-selected one of the command key units is the OFF signal; configuring the base microprocessor unit to control the status indicator of the at least one of the two-state switch keys corresponding to the user-selected one of the command key units for indicating the switch state of the at least one of the switches, corresponding to the at least one of the two-state switch keys, stored in the base memory; and configuring the base microprocessor unit to control the at least one of the switches corresponding to the at least one of the two-state switch keys to operate according to the switch state stored in the base memory, such that when the switch state stored in the base memory is the ON state, the base microprocessor unit controls the at least one of the switches to operate in the ON state for allowing transmission of the DC power signal to the corresponding one of the electric lamps, and such that when the switch state stored in the base memory is the OFF state, the base microprocessor unit controls the at least one of the switches to operate in the OFF state for interrupting transmission of the DC power signal to the corresponding one of the electric lamps.

An advantage of the third aspect of the present invention resides in providing the innovative wireless intelligent lamp control method to be implemented by the wall switch base in cooperation with the remote switch handset, so as to establish the matching relations between the two-state switch keys and the command key units for expanding purposes thereof.

In a fourth aspect of the present invention, a wall switch base that offers greater flexibility is provided.

The wall switch base is adapted for wireless communication with a remote switch handset. The remote switch handset includes a plurality of command key units and a handset microprocessor unit. The handset microprocessor unit is configured to transmit a wireless signal indicating a user-selected one of the command key units of the remote switch handset. The wall switch base comprises a plurality of two-state switch keys and a base microprocessor unit. A user-selected one of the two-state switch keys is operable to send a trigger signal set that includes at least one trigger signal. The base microprocessor unit is coupled electrically to each of the two-state switch keys. The base microprocessor unit is configured: to receive the trigger signal set including the at least one trigger signal sent from the user-selected one of the two-state switch keys, and to determine at least one of a number and a duration of the at least one trigger signal in the trigger signal set; to receive the wireless signal wirelessly transmitted by the handset microprocessor unit and indicating the user-selected one of the command key units, and to establish a matching relation between the user-selected one of the two-state switch keys and the user-selected one of the command key units when the base microprocessor unit determines that the trigger signal set includes only one trigger signal and the duration of the trigger signal is longer than a trigger threshold time; and to wirelessly transmit the matching relation to the handset microprocessor unit.

Preferably, the wall switch base further comprises a plurality of switches each controllable to operate in a switch state. Each of the switches is configured to receive a direct current (DC) power signal and is adapted to be coupled electrically to a corresponding electric lamp. The base microprocessor unit includes a base memory that stores corresponding relations between the two-state switch keys and the switches, and the switch state of each of the switches. Each of the two-state switch keys includes a status indicator. The base microprocessor unit is further configured: to determine a corresponding one of the switches that corresponds to the user-selected one of the switch keys according to the corresponding relations stored in the base memory, and to change the switch state of the corresponding one of the switches stored in the base memory when the base microprocessor unit determines that the trigger signal set includes only one trigger signal and that the duration of the trigger signal is shorter than the trigger threshold time; to control the status indicator of the user-selected one of the two-state switch keys to indicate the switch state of the corresponding one of the switches stored in the base memory; and to control the corresponding one of the switches corresponding to the user-selected one of the two-state switch keys to operate according to the switch state stored in the base memory, such that when the switch state stored in the base memory is an ON state, the base microprocessor unit controls the corresponding one of the switches to operate in the ON state for allowing transmission of the DC power signal to the corresponding electric lamp, and such that when the switch state stored in the base memory is an OFF state, the base microprocessor unit controls the corresponding one of the switches to operate in the OFF state for interrupting transmission of the DC power signal to the corresponding electric lamp.

Preferably, each of the status indicators includes a light-emitting diode (LED). The base microprocessor unit turns off the LED of the status indicator of the user-selected one of the two-state switch keys when the switch state of the corresponding one of the switches stored in the base memory is the ON state, and turns on the LED of the status indicator of the user-selected one of the two-state switch keys when the switch state of the corresponding one of the switches stored in the base memory is the OFF state.

An advantage of the fourth aspect of the present invention resides in providing the innovative wall switch base in cooperation with the remote switch handset, so as to establish the matching relations between the two-state switch keys and the command key units for expanding purposes thereof.

In a fifth aspect of the present invention, a wireless intelligent lamp control method that offers greater flexibility is provided. The wireless intelligent lamp control method is to be implemented by a remote switch handset for wireless communication with a wall switch base. The remote switch handset includes a plurality of command key units and a handset microprocessor unit that includes a handset memory. Each of the command key units includes an ON key. The wall switch base includes a plurality of two-state switch keys and a base microprocessor unit. The wireless intelligent lamp control method comprises: (A) configuring the handset microprocessor unit to receive an ON signal set including at least one ON signal sent from the ON key of a user-selected one of the command key units, and to determine at least one of a number and a duration of the at least one ON signal in the ON signal set; (B) configuring the handset microprocessor unit to transmit a wireless signal indicating the user-selected one of the command key units to the base microprocessor unit for enabling the base microprocessor unit to establish a matching relation between a user-selected one of the two-state switch keys and the user-selected one of the command key units when the handset microprocessor unit determines that the ON signal set includes only one ON signal and the duration of the ON signal is longer than an ON threshold time; and (C) configuring the handset microprocessor unit to wirelessly receive the matching relation from the base microprocessor unit, and to store the matching relation in the handset memory.

Preferably, the wall switch base is coupled electrically to a plurality of electric lamps corresponding respectively to the two-state switch keys. The handset memory of the handset microprocessor unit stores matching data associated with the matching relations between the plurality of two-state switch keys and the plurality of command key units. The wireless intelligent lamp control method further comprises: (D1) configuring the handset microprocessor unit to inspect the matching data stored in the handset memory for ma king a determination as to whether there is any matching relation associated with the user-selected one of the command key units when the handset microprocessor unit determines in step (A) that the ON signal set includes only one ON signal and the duration of the ON signal is shorter than the ON threshold time; and (D2) configuring the handset microprocessor unit to wirelessly transmit a control signal that indicates the ON signal sent from the user-selected one of the command key units of the remote switch handset and that indicates at least one of the two-state switch keys corresponding to the user-selected one of the command key units according to the matching relations when a result of the determination made in step (D1) is affirmative, such that the base microprocessor unit is able to turn on the electric lamp corresponding to the user-selected one of the command key units upon receipt of the control signal.

An advantage of the fifth aspect of the present invention resides in providing the innovative wireless intelligent lamp control method to be implemented by the innovative remote switch handset in cooperation with the wall switch base, so as to establish the matching relations between the two-state switch keys and the command key units for expanding purposes thereof.

In a sixth aspect of the present invention, a remote switch handset that offers greater flexibility is provided.

The remote switch handset is adapted for wireless communication with a wall switch base. The wall switch base includes a plurality of two-state switch keys and a base microprocessor unit. The remote switch handset comprises a plurality of command key units and a handset microprocessor unit. Each of the command key units includes an ON key. The ON key of a user-selected one of the command key units is operable to send an ON signal set that includes at least one ON signal. The handset microprocessor unit includes a handset memory, and is coupled electrically to each of the command key units. The handset microprocessor unit is configured: to receive the ON signal set including the at least one ON signal sent from the ON key of the user-selected one of the command key units, and to determine at least one of a number and a duration of the at least one ON signal in the ON signal set; to transmit a wireless signal indicating the user-selected one of the command key units to the base microprocessor unit for enabling the base microprocessor unit to establish a matching relation between a user-selected one of the two-state switch keys and the user-selected one of the command key units when the handset microprocessor unit determines that the ON signal set includes only one ON signal and the duration of the ON signal is longer than an ON threshold time; and to wirelessly receive the matching relation from the base microprocessor unit, and to store the matching relation in the handset memory.

Preferably, the remote switch handset further comprises a battery that is coupled electrically to the handset microprocessor unit and that provides electric power thereto.

Preferably, the wall switch base is coupled electrically to a plurality of electric lamps corresponding respectively to the two-state switch keys. Each of the command key unit s of the remote switch handset further includes an OFF key operable to send an OFF signal. The handset memory of the handset microprocessor unit stores matching data associated with the matching relations between the plurality of two-state switch keys and the plurality of command key units. The handset microprocessor unit is further configured: to receive the OFF signal from the OFF key of the user-selected one of the command key units, and to determine whether a duration of the OFF signal is longer than an OFF threshold time; to erase part of the matching data, which corresponds to the matching relation associated with the user-selected one of the command key units, stored in the handset memory when the handset microprocessor unit determines that the duration of the OFF signal is longer than the OFF threshold time; to inspect the matching data stored in the handset memory for making a determination as to whether there is any matching relation associated with the user-selected one of the command key units when the handset microprocessor unit determines that the duration of the OFF signal is shorter than the OFF threshold time; and to wirelessly transmit a control signal that indicates the OFF signal sent from the user-selected one of the command key units of the remote switch handset and that indicates at least one of the two-state switch keys corresponding to the user-selected one of the command key units according to the matching relations when a result of the determination is affirmative, such that the base microprocessor unit is able to turn off the electric lamp corresponding to the user-selected one of the command key units upon receipt of the control signal.

An advantage of the sixth aspect of the present invention resides in providing the innovative remote switch handset in cooperation with the wall switch base, so as to establish the matching relations between the two-state switch keys and the command key units for expanding purposes thereof.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
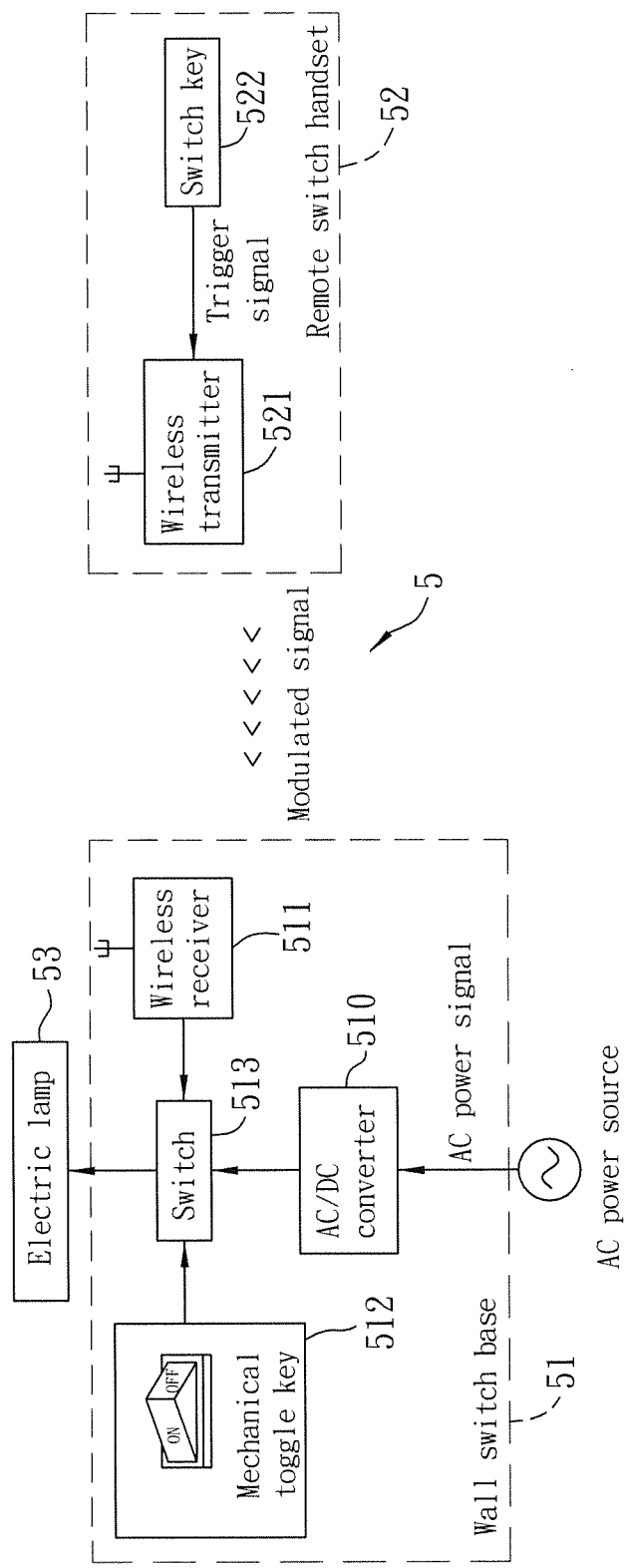
FIG. 1 is a block diagram of a conventional wireless intelligent lamp control system.
Figure 2:
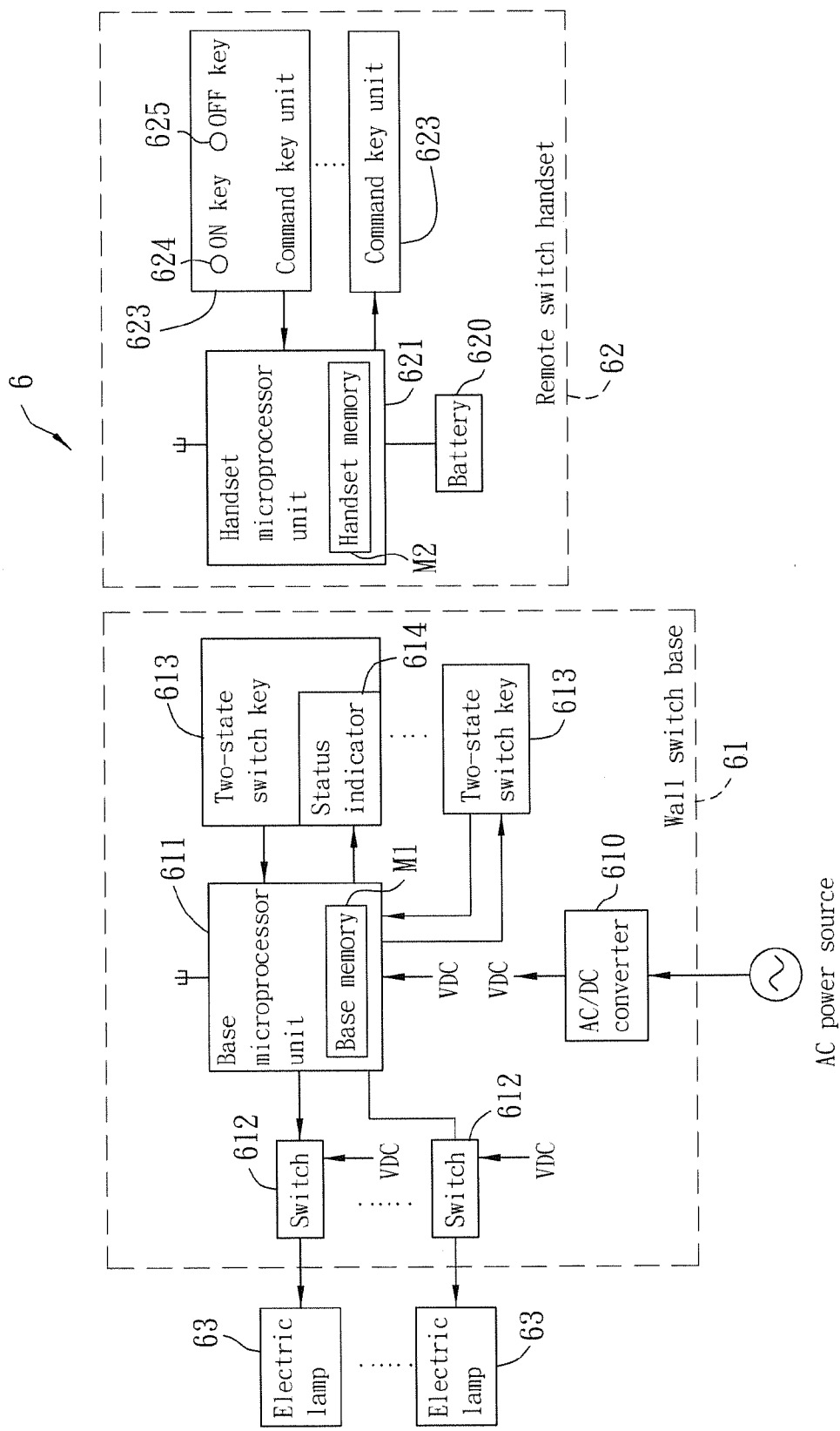
FIG. 2 is a block diagram of a preferred embodiment of a wireless intelligent lamp control system, according to the present invention.

Referring to FIG. 2, a preferred embodiment of a wireless intelligent lamp control system, according to the pre sent invention, comprises a plurality of electric lamps 63 and an intelligent switch apparatus 6.

The intelligent switch apparatus 6 includes a wall switch base 61 and a remote switch handset 62.

The wall switch base 61 is fixed to a wall, is coupled electrically between an alternating-current (AC) power source which provides an AC power signal and the plurality of electric lamps 63, and controls operation of the electric lamps 63. The wall switch base 61 includes an alternating-current to direct-current (AC/DC) converter 610, a base microprocessor unit 611, a plurality of switches 612, and a plurality of two-state switch keys 613. Each of the two-state switch keys 613 includes a status indicator 614 which indicates an ON status, an OFF status, and an undergoing-matching status. In this embodiment, the status indicator 614 includes a light-emitting diode (LED).

The AC/DC converter 610 is coupled electrically to the AC power source for receiving the AC power signal and generating a DC power signal (VDC) from the AC power signal.

The base microprocessor unit 611 is coupled electrically to the AC/DC converter 61 for receiving the DC power signal (VDC) as required electric power, and is further coupled electrically to each of the two-state switch keys 613 and each of the switches 612.

Each of the switches 612 is coupled electrically to the AC/DC converter 610 for receiving the DC power signal (VDC), and is coupled electrically to a corresponding one of the electric lamps 63. Each of the switches 612 is controllable to switch between an ON state and an OFF state for allowing and interrupting a flow of the DC power signal (VDC) to the corresponding one of the electric lamps 63 so as to turn on and turnoff the electric lamp 63.

Each of the two-state switch keys 613 is operable by a user to send a trigger signal.

The base microprocessor unit 611 includes a base memory (M1). The base memory (M1) stores corresponding relations between the two-state switch keys 613 and the switches 612, and a switch state (an ON state or an OFF state) of each of the switches 612. In this embodiment, the corresponding relations between the two-state switch keys 613 and the switches 612 are one-to-one correspondence.

The remote switch handset 62 is adapted to wirelessly control the wall switch base 61 and may be portable to facilitate carrying by the user. The remote switch handset 62 includes a plurality of command key units 623, a handset microprocessor unit 621, and a battery 620.

Each of the command key units 623 includes an ON key 624 operable to send an ON signal, and an OFF key 625 operable to send an OFF signal.

The handset microprocessor unit 621 is coupled electrically to each of the command key units 623, and includes a handset memory (M2) that stores matching data. The matching data is associated with matching relations between the command key units 623 and the two-state switch keys 613 of the wall switch base 61.

The battery 620 is coupled electrically to the handset microprocessor unit 621 for providing electric power required thereby.

The wireless intelligent lamp control system is configured to implement a wireless intelligent lamp control method. The wireless intelligent lamp control method includes a wireless base control procedure which is implemented by the base microprocessor unit 611 and a wireless handset control procedure which is implemented by the handset microprocessor unit 621.

Figure 3A:
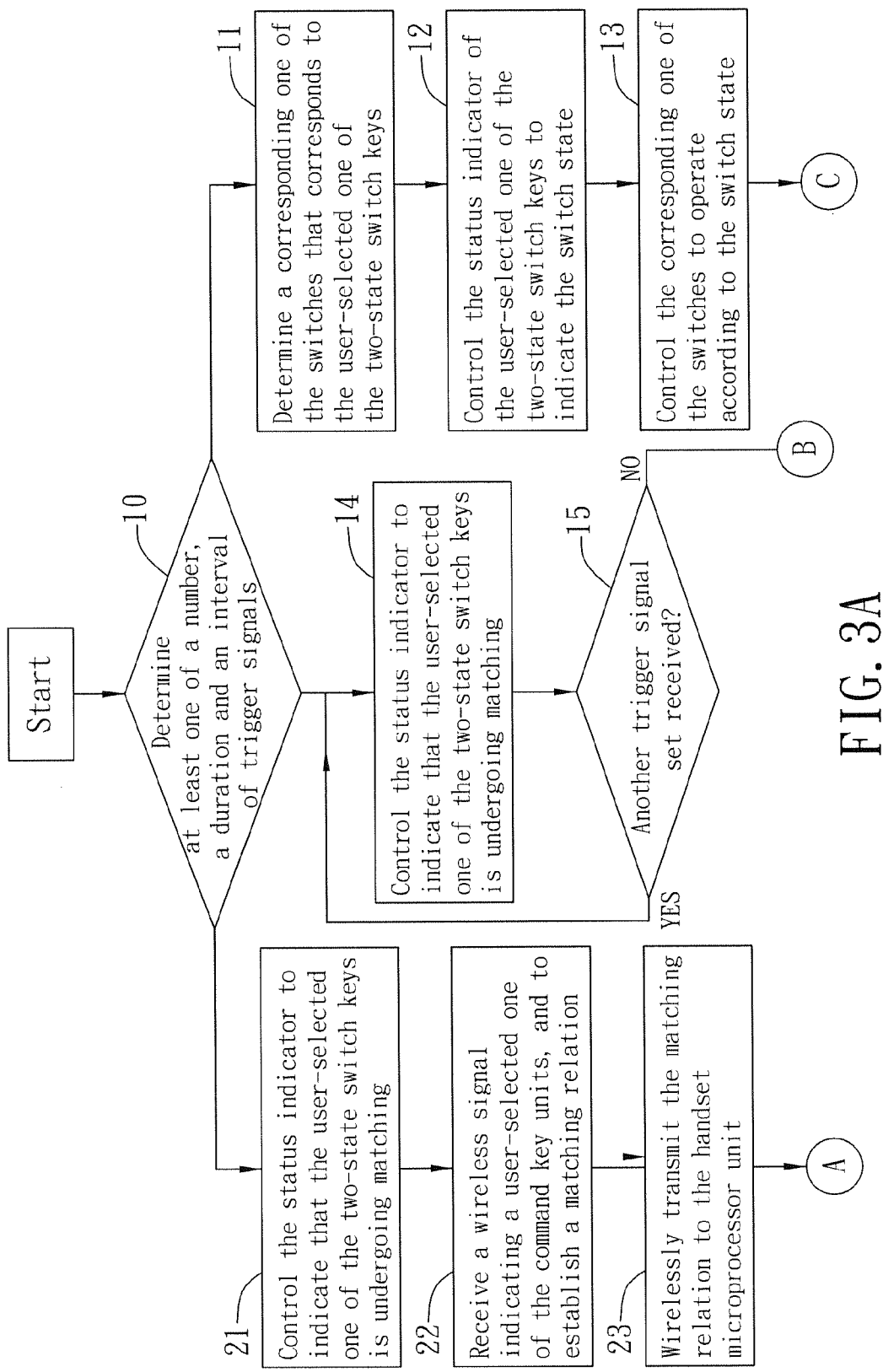
FIGS. 3A and 3B are a flow chart illustrating intelligent lamp base control and matching establishment performed by a wall switch base in the preferred embodiment.
Figure 3B:
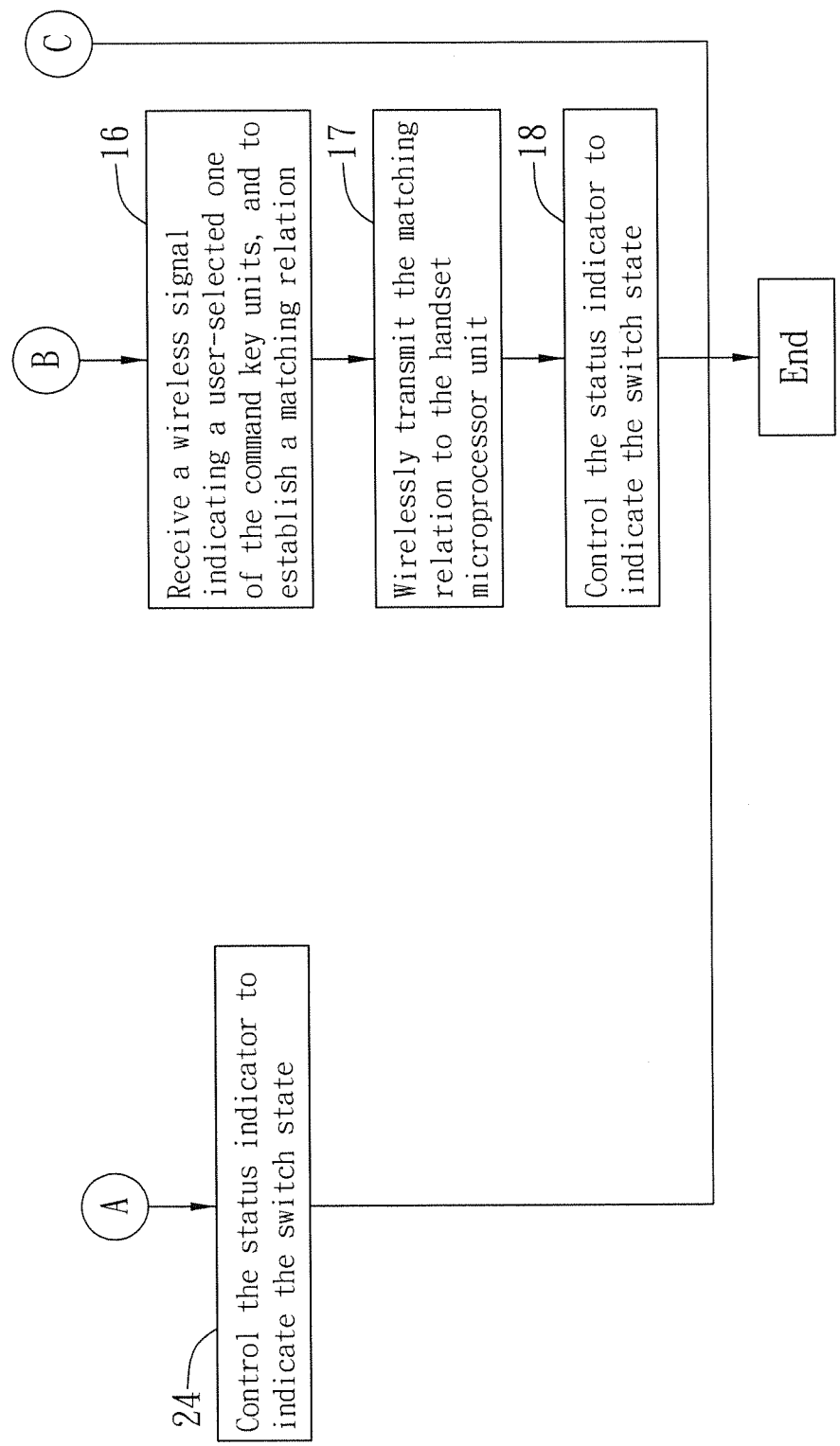

Referring to FIG. 2 and FIGS. 3A and 3B, the wireless base control procedure which is implemented by the base microprocessor unit 611 is adapted for wireless communication with the remote switch handset 62, and includes the following steps.

In step 10, the base microprocessor unit 611 is configured to receive a trigger signal set including at least one trigger signal sent from a user-selected one of the two-state switch keys 613, and to determine at least one of a number and a duration of the at least one trigger signal in the trigger signal set, and an interval between two consecutive trigger signals in the trigger signal set.

In step 11, the base microprocessor unit 61 is configured to determine a corresponding one of the switches 612 that corresponds to the user-selected one of the two-state switch keys 613 according to the corresponding relations stored in the base memory (M1), and to change the switch state of the corresponding one of the switches 612 stored in the base memory (M1) when the base microprocessor unit 61 determines in step 10 that the trigger signal set includes only one trigger signal and that the duration of the trigger signal is shorter than the trigger threshold time (for example, 1 second), i.e., the user performed a single-short-strike on the user-selected one of the two-state switch keys 613. If the switch state of the corresponding one of the switches 612 stored in the base memory (M1) is the OFF state, the base microprocessor unit 611 changes the switch state thereof from the OFF state to the ON state. On the other hand, if the switch state of the corresponding one of the switches 612 stored in the base memory (M1) is the ON state, the base microprocessor unit 611 changes the switch state thereof from the ON state to the OFF state.

In step 12, the base microprocessor unit 611 is configured to control the status indicator 614 of the user-selected one of the two-state switch keys 613 to indicate the switch state of the corresponding one of the switches 612 stored in the base memory (M1). In this embodiment, if the switch state of the corresponding one of the switches 612 stored in the base memory (M1) is the ON state, the base microprocessor unit 611 turns off the LED of the status indicator 614 of the user-selected one of the two-state switch keys 613 (i.e., the status indicator 614 indicates the ON status). On the other hand, if the switch state of the corresponding one of the switches 612 stored in the base memory (M1) is the OFF state, the base microprocessor unit 611 turns on the LED of the status indicator 614 of the user-selected one of the two-state switch keys 613 (i.e., the status indicator 614 indicates the OFF status).

In step 13, the base microprocessor unit 611 is configured to control the corresponding one of the switches 612 corresponding to the user-selected one of the two-state switch keys 614 to operate according to the switch state stored in the base memory (M1), such that when the switch state stored in the base memory (M1) is the ON state, the base microprocessor unit 611 controls the corresponding one of the switches 612 to operate in the ON state for allowing transmission of the DC power signal (VDC) to the corresponding one of the electric lamps 63, and such that when the switch state stored in the base memory (M1) is an OFF state, the base microprocessor unit 611 controls the corresponding one of the switches 612 to operate in the OFF state for interrupting transmission of the DC power signal (VDC) to the corresponding one of the electric lamps 63.

In this way, by means of a design of the two-state switch keys 613 and the status indicators 614, in cooperation with control of the base microprocessor unit 611 in step 12, the status indicator 614 is synchronized with on and off conditions of the corresponding one of the electric lamps 63, so that the status indicator 614 indicates the ON status (the LED is turned off) when the electric lamp 63 is turned on, and indicates the OFF status (the LED is turned on) when the electric lamp 63 is turned off. It may be readily appreciated by those skilled in the art that execution sequence of the aforementioned steps 12 and 13 is exchangeable, and the two steps may be concurrently executable.

In step 14, the base microprocessor unit 611 is configured to control the status indicator 614 of the user-selected one of the two-state switch keys 613 to indicate that the user-selected one of the two-state switch keys 613 is undergoing matching (i.e., the status indicator 614 indicates the undergoing-matching status) when the base microprocessor unit 611 determines in step 10 that the trigger signal set includes two consecutive trigger signals, that the duration of each of the two consecutive trigger signals is shorter than the trigger threshold time, and that the interval between the two consecutive trigger signals is shorter than a predetermined time interval (for example, 0.5 second) i.e., the user performed a double-short-strike on the user-selected one of the two-state switch keys 613. In this embodiment, the status indicator 614 flickers to indicate that the two-state switch key 613 is undergoing matching.

In step 15, the base microprocessor unit 611 is configured to determine whether another trigger signal set, which includes two consecutive trigger signals each having the duration shorter than the trigger threshold time and the interval between the two consecutive trigger signals being shorter than the predetermined time interval, is received from another user-selected one of the two-state switch keys 613, and if affirmative, the base microprocessor unit 611 is configured to control the status indicator 614 of said another user-selected one of the two-state switch keys 613 to indicate that said another user-selected one of the two-state switch keys 613 is undergoing matching.

In step 16, the base microprocessor unit 611 is configured to receive a wireless signal wirelessly transmitted by the handset microprocessor unit 621 and indicating a user-selected one of the command key units 623 of the remote switch handset 62, and to establish a matching relation between the user-selected one of the command key units 623 and each user-selected one of the two-state switch keys 613 when the base microprocessor unit 611 determines that said another trigger signal set is not received in step 15.

In step 17, the base microprocessor unit 611 is configured to wirelessly transmit the matching relation established in step 16 to the handset microprocessor unit 621 for storage in the handset memory (M2) so as to finish setup of the matching relations.

In step 18, the base microprocessor unit 611 is configured to control the status indicator 614 of each user-selected one of the two-state switch keys 613 to indicate the switch state of the corresponding one of the switches 612 corresponding thereto according to the corresponding relations and the switch states stored in the base memory (M1), such that indication by the status indicator 614 is consistent with the on or off condition of the corresponding one of the electric lamps 63.

In step 21, the base microprocessor unit 611 is configured to control the status indicator 614 of the user-selected one of the two-state switch keys 613 to indicate that the user-selected one of the two-state switch keys 613 is undergoing matching when the base microprocessor unit 611 determines that the trigger signal set includes only one trigger signal and the duration of the trigger signal is longer than the trigger threshold time, i.e., the user performed a long-strike on the user-selected one of the two-state switch keys 613. In this embodiment, the status indicator 614 flickers to indicate that the two-state switch key 613 is undergoing matching.

In step 22, the base microprocessor unit 611 is configured to receive the wireless signal wirelessly transmitted by the handset microprocessor unit 621 and indicating the user-selected one of the command key units 623, and to establish a matching relation between the user-selected one of the two-state switch keys 613 and the user-selected one of the command key units 623.

In step 23, the base microprocessor unit 611 is configured to wirelessly transmit the matching relation established in step 22 to the handset microprocessor unit 621 for storage in the handset memory (M2) so as to finish setup of the matching relations.

In step 24, the base microprocessor unit 611 is configured to control the status indicator 614 of the user-selected one of the two-state switch keys 613 to indicate the switch state of the corresponding one of the switches 612 corresponding to the user-selected one of the two-state switch keys 613 according to the corresponding relations and the switch states stored in the base memory (M1), such that indication by the status indicator 614 is consistent with the on or off condition of the corresponding one of the electric lamps 63.

Figure 4:
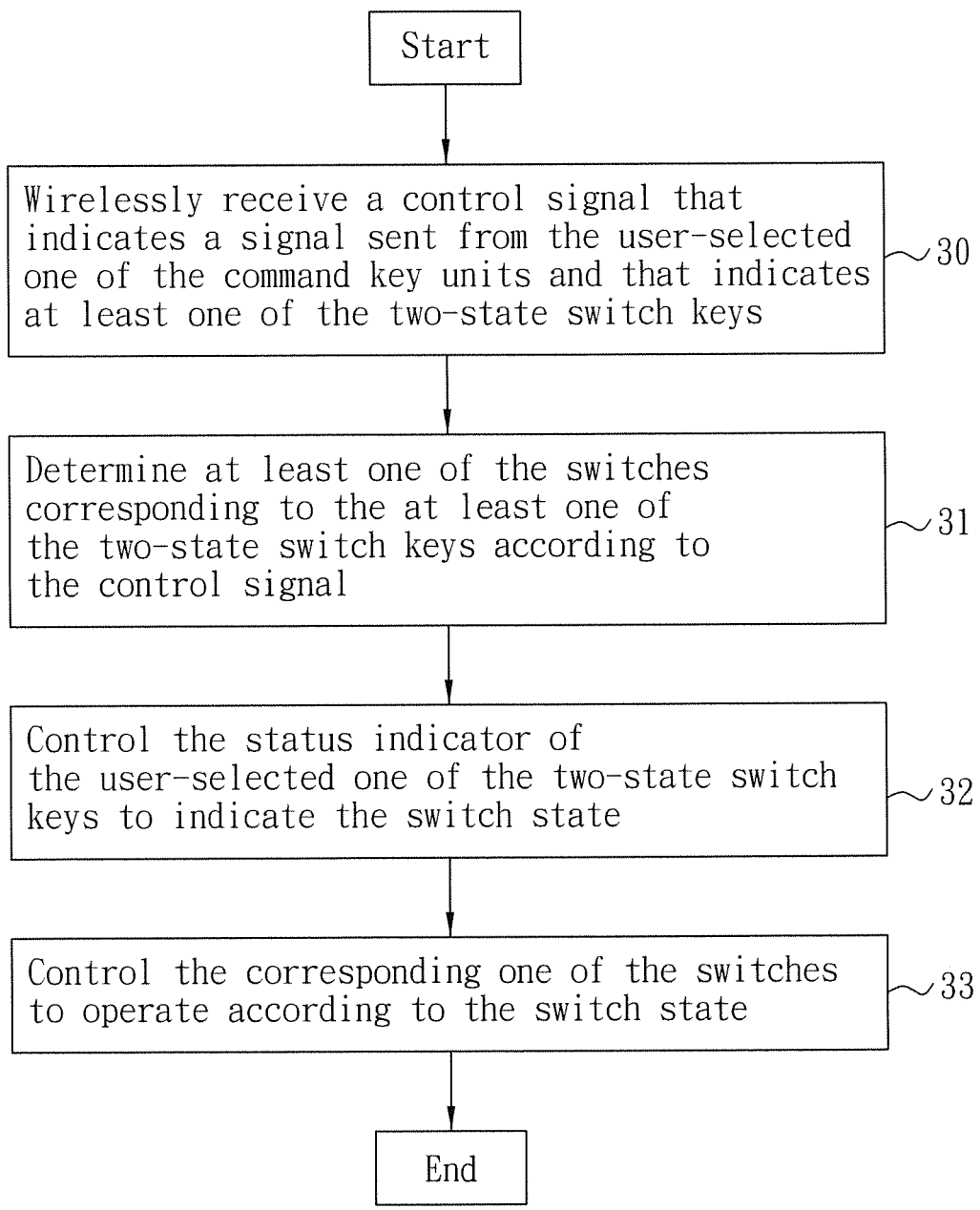
FIG. 4 is a flow chart illustrating intelligent lamp remote control performed by the wall switch base in the preferred embodiment.

Referring to FIG. 2 and FIG. 4, the wireless base control procedure, which is implemented by the base microprocessor unit 611 for turning on and turning off the electric lamps 63 according to control of the remote switch handset 62, is illustrated.

In step 30, the base microprocessor unit 611 is configured to wirelessly receive from the handset microprocessor unit 621 a control signal that indicates a signal sent from the user-selected one of the command key units 623 of the remote switch handset 62 and that indicates at least one of the two-state switch keys 613 corresponding to the user-selected one of the command key units 623. The control signal is correspondingly generated by the remote switch handset 62 according to the matching relations set in the aforementioned steps 17 and 23 (details of the same will be provided hereinafter).

In step 31, the base microprocessor unit 611 is configured to determine at least one of the switches 612 corresponding to the at least one of the two-state switch keys 613 according to the control signal and the corresponding relations stored in the base memory (M1), and to change the switch state of the at least one of the switches 612 stored in the base memory (M1) according to the control signal. The base microprocessor unit 611 sets the switch state stored in the base memory (M1) and corresponding to the at least one of the switches 612 to an ON state when the control signal indicates the signal sent from the user-selected one of the command key units 623 is the ON signal, and sets the switch state stored in the base memory (M1) and corresponding to the at least one of the switches 612 to an OFF state when the control signal indicates the signal sent from the user-selected one of the command key units 623 is the OFF signal.

In step 32, the base microprocessor unit 611 is configured to control the status indicator 614 of the at least one of the two-state switch keys 613 corresponding to the user-selected one of the command key units 623 for indicating the switch state of the at least one of the switches 612, corresponding to the user-selected one of the two-state switch keys 613, stored in the base memory (M1).

In step 33, the base microprocessor unit 611 is configured to control the at least one of the switches 612 corresponding to the at least one of the two-state switch keys 613 to operate according to the switch state stored in the base memory (M1), such that when the switch state stored in the base memory (M1) is the ON state, the base microprocessor unit 611 controls the at least one of the switches 612 to operate in the ON state for allowing transmission of the DC power signal (VDC) to the corresponding one of the electric lamps 63, and such that when the switch state stored in the base memory (M1) is the OFF state, the base microprocessor unit 611 controls the at least one of the switches 612 to operate in the OFF state for interrupting transmission of the DC power signal (VDC) to the corresponding one of the electric lamps 63.

Figure 5:
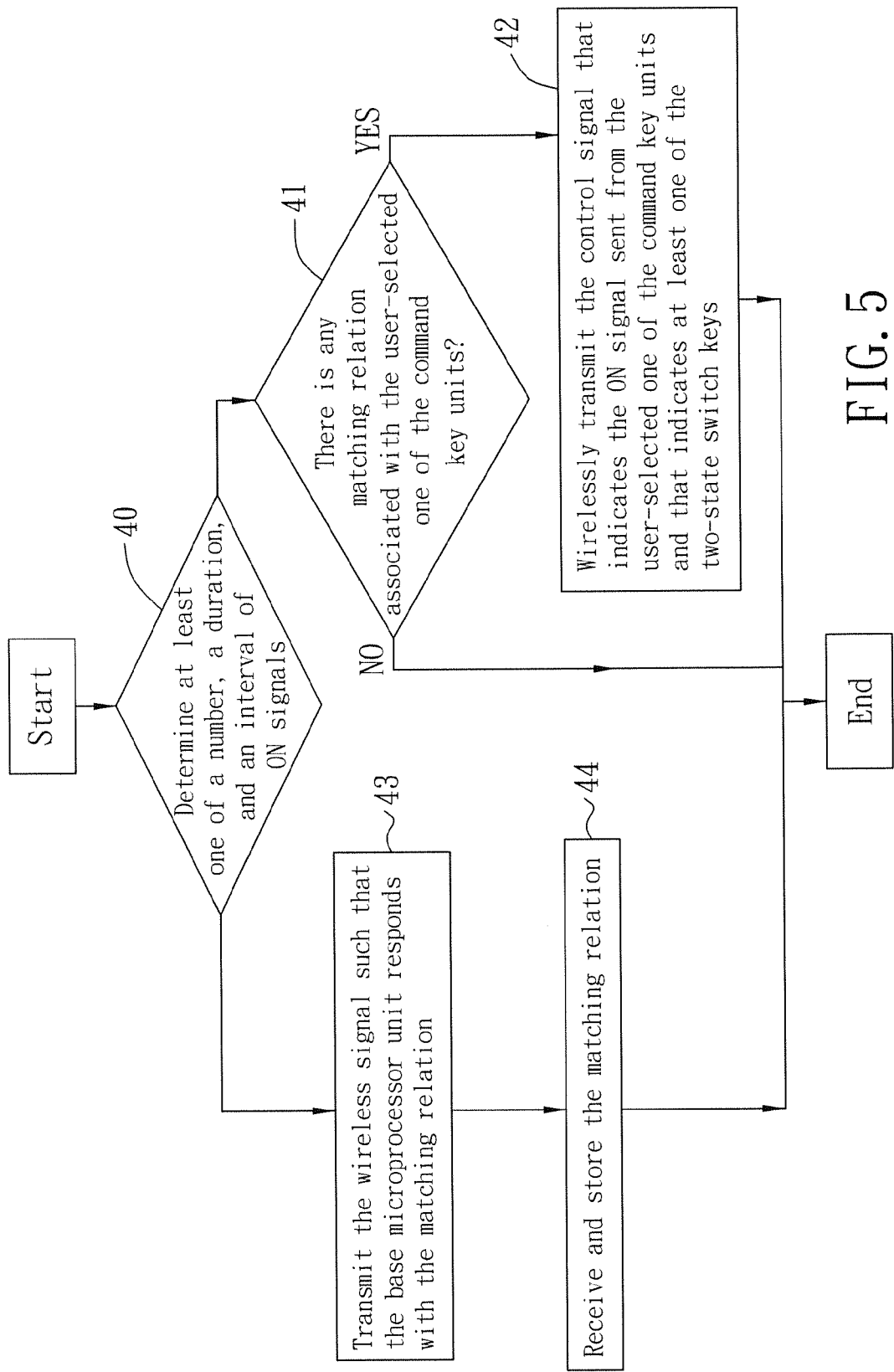
FIG. 5 is a flow chart illustrating intelligent lamp remote turn-on and the matching establishment performed by a remote switch handset in the preferred embodiment.

Referring to FIG. 2 and FIG. 5, the wireless handset control procedure, which is implemented by the handset microprocessor unit 621 for wireless communication with the wall switch base 61, includes the following steps.

In step 40, the handset microprocessor unit 621 is configured to receive an ON signal set including at least one ON signal sent from the ON key 624 of a user-selected one of the command key units 623, and to determine at least one of a number and a duration of the at least one ON signal in the ON signal set, and an interval between two consecutive ON signals in the ON signal set.

In step 41, the handset microprocessor unit 621 is configured to inspect the matching data stored in the handset memory (M2) for making a determination as to whether there is any matching relation associated with the user-selected one of the command key units 623 when the handset microprocessor unit 611 determines in step 40 that the ON signal set includes only one ON signal and the duration of the ON signal is shorter than an ON threshold time (for example, 1 second), i.e., the user performed a single-short-strike on the ON key 624 of the user-selected one of the command key units 623. When a result of the determination is negative, it means that the user-selected one of the command key units 623 does not have any matching relation assigned thereto, and the flow ends.

In step 42, the handset microprocessor unit 621 is configured to wirelessly transmit the control signal that indicates the ON signal sent from the user-selected one of the command key units 623 of the remote switch handset 62 and that indicates at least one of the two-state switch keys 613 corresponding to the user-selected one of the command key units 623 according to the matching relations when the result of the determination made in step 41 is affirmative. In this way, as illustrated in the aforementioned step 30, the wall switch base 61 receives the control signal and performs steps 31∼33 so as to turn on the corresponding one of the electric lamps 63 that corresponds to the user-selected one of the command key units 623.

In step 43, the handset microprocessor unit 611 is configured to transmit the wireless signal indicating the user-selected one of the command key units 623 such that the base microprocessor unit 611 responds with the matching relation according to steps 16 and 22 when the handset microprocessor unit 621 determines in step 40 that the ON signal set includes only one ON signal and the duration of the ON signal is longer than the ON threshold time, i.e., the user performed a long-strike on the ON key 624 of the user-selected one of the command key units 623. Alternatively, the handset microprocessor unit 611 is configured to transmit the wireless signal when the handset microprocessor unit 621 determines in step 40 that the ON signal set includes two consecutive ON signals, that the duration of each of the two consecutive ON signals is shorter than the ON threshold time, and that the interval between the two consecutive ON signals is shorter than a predetermined time interval (for example, 0.5 second) i.e., the user performed a double-short-strike on the ON key 624 of the user-selected one of the command key units 623.

In step 44, the handset microprocessor unit 621 is configured to receive the matching relation wirelessly transmitted by the base microprocessor unit 611, and to store the matching relation in the handset memory (M2) as part of the matching data.

Figure 6:
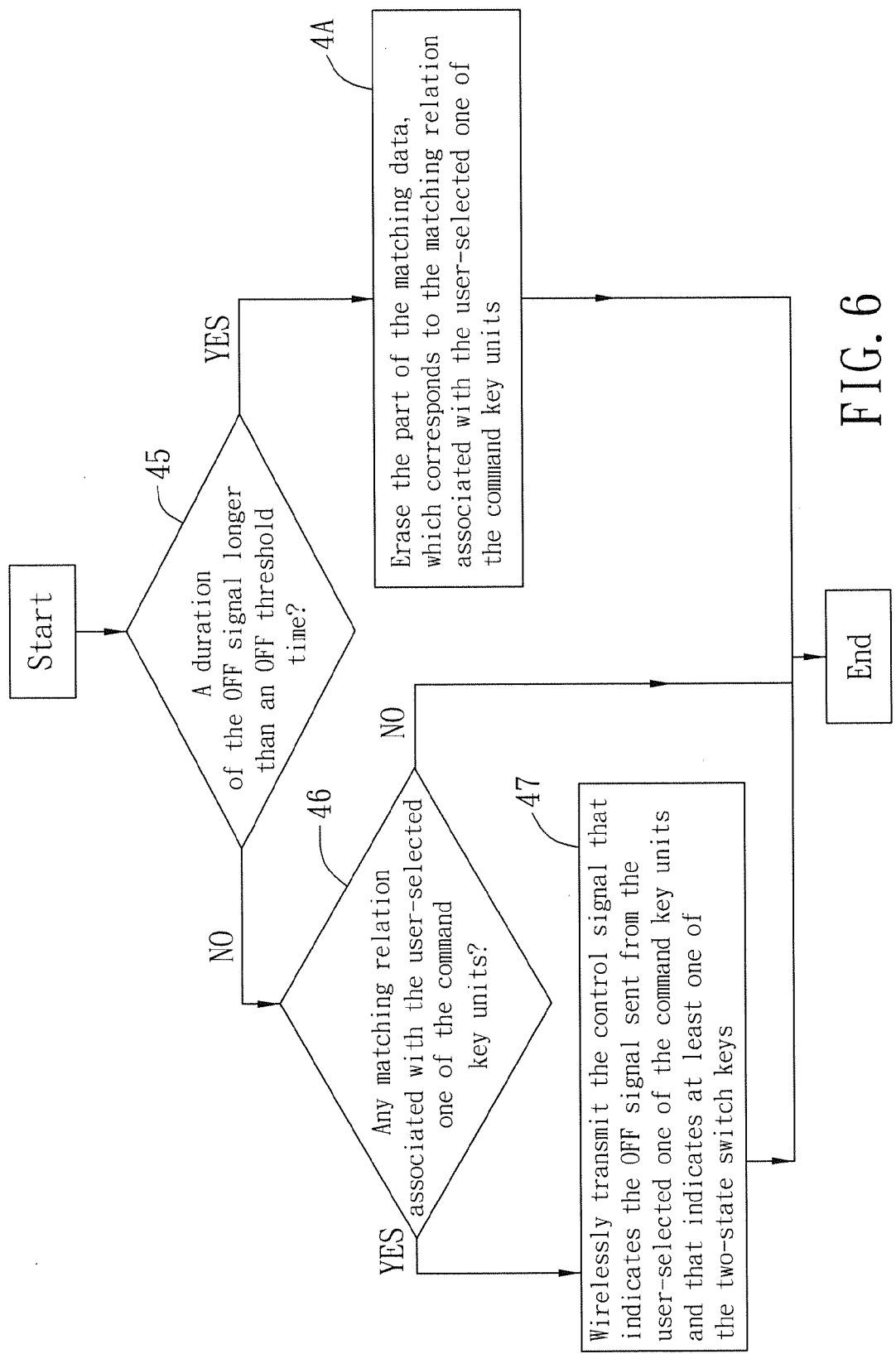
FIG. 6 is a flow chart illustrating intelligent lamp remote turn-off and matching cancellation performed by the remote switch handset in the preferred embodiment.

Referring to FIG. 2 and FIG. 6, the wireless handset control procedure further includes the following steps.

In step 45, the handset microprocessor unit 621 is configured to receive the OFF signal from the OFF key 625 of the user-selected one of the command key units 623, and to determine whether a duration of the OFF signal is longer than an OFF threshold time (for example, 1 second).

In step 4A, the handset microprocessor unit 621 is configured to erase the part of the matching data, which corresponds to the matching relation associated with the user-selected one of the command key units 623, stored in the handset memory (M2) when the handset microprocessor unit 621 determines in step 45 that the duration of the OFF signal is longer than the OFF threshold time. In this way, the user may reset matching relations between the user-selected one of the command key units 623 and the electric lamps 63. It is noted that, in this embodiment, the long-strike performed on the OFF key 625 of the user-selected one of the command key units 623 is adopted for erasing the part of the matching data, and the part of the matching data may be erased in another manner such as performing a two-short-strikes on the OFF key 625 of the user-selected one of the command key units 623.

In step 46, the handset microprocessor unit 621 is configured to inspect the matching data stored in the handset memory (M2) for making a determination as to whether there is any matching relation associated with the user-selected one of the command key units 623 when the handset microprocessor unit 621 determines in step 45 that the duration of the OFF signal is shorter than the OFF threshold time.

In step 47, the handset microprocessor unit 621 is configured to wirelessly transmit the control signal that indicates the OFF signal sent from the user-selected one of the command key units 623 of the remote switch handset 62 and that indicates at least one of the two-state switch keys 613 corresponding to the user-selected one of the command key units 623 according to the matching relations when a result of the determination made in step 46 is affirmative. In this way, the wall switch base 61 receives the control signal and performs steps 31~33 so as to turn off the corresponding electric lamp 63 that corresponds to the user-selected one of the command key units 623.

Therefore, in application, the user may match the plurality of two-state switch keys 613 with the plurality of command key units 623 according to the following three matching modes, which include a one-to-one mode (i.e., one two-state switch key 613 corresponds to one command key unit 623) and two many-to-one modes (i.e., many two-state switch keys 613 correspond to one command key unit 623).

When the user adopts the one-to-one mode for matching establishment, first, the user performs the long-strike on a user-selected one of the two-state switch keys 613, to which a to-be-controlled one of the electric lamps 63 corresponds, so as to make the base microprocessor unit 611 perform steps 10 and 21 such that a corresponding one of the status indicators 614 flickers to indicate that the user-selected one of the two-state switch keys 613 is undergoing matching. Subsequently, the user performs the long-strike on the ON key 624 of a user-selected one of the command key units 623 of the remote switch handset 62 for matching establishment. The base microprocessor unit 611 performs steps 22~24 and the handset microprocessor unit 621 performs steps 43~44, such that the remote switch handset 62 stores the matching relation and the status indicator 614 stops flickering for indicating that the user-selected one of the two-state switch keys 613 has been matched successfully with the user-selected one of the command key units 623.

When the user adopts a first one of the many-to-one modes for matching establishment, aside from the aforementioned one-to-one mode, the user may further perform the long-strike on another user-selected one of the two-state switch keys 613, to which another to-be-controlled one of the electric lamps 63 corresponds, so as to make the base microprocessor unit 611 perform steps 10 and 21. Subsequently, the user performs the long-strike on the ON key 624 of the same user-selected one of the command key units 623 of the remote switch handset 62 for matching establishment. The base microprocessor unit 611 performs steps 22~24 and the handset microprocessor unit 621 performs steps 43~44 for expanding the matching relations to which the user-selected one of the command key units 623 corresponds such that the status indicator 614 stops flickering for indicating that the another user-selected one of the two-state switch keys 613 has been matched successfully with the same user-selected one of the command key units 623. If the same user-selected one of the command key units 623 is desired for controlling more electric lamps 63 (i.e., matching establishment is continued), steps 10, 21~24, and 43~44 are merely required to be repeated. In this way, the user may expand control of the electric lamps 63 that are to be simultaneously controlled based on the user's needs at any time.

When the user adopts a second one of the many-to-one modes for matching establishment, first of all, the user performs the double-short-strike on a user-selected one of the two-state switch keys 613 so as to make the base microprocessor unit 611 perform steps 10 and 14 such that a corresponding one of the status indicators 614 flickers to indicate that the user-selected one of the two-state switch keys 613 is undergoing matching. Subsequently, the user performs the double-short-strike on another user-selected one of the two-state switch keys 613 such that another corresponding one of the status indicators 614 flickers to indicate that the another user-selected one of the two-state switch keys 613 is undergoing matching. If the user intends to include still another user-selected one of the two-state switch keys 613 for matching establishment, the user may perform once again the double-short-strike on the still another user-selected one of the two-state switch keys 613 of the wall switch base 61. Otherwise, the user performs the double-short-strike on the ON key 624 of a user-selected one of the command key units 623 of the remote switch base 62 for matching establishment. The base microprocessor unit 611 performs steps 16~18 and the handset microprocessor unit 621 performs steps 43~44, such that the remote switch handset 62 stores the matching relations and the status indicators 614 stop flickering for indicating that the user-selected two-mode switch keys 613 have been matched successfully with the user-selected one of the command key units 623. In this way, the user may take advantage of the second one of the many-to-one modes so as to effectively reduce matching time when the user intends to set the matching relations between a single one of the command key units 623 and many of the two-state switch keys 613 to which many of the electric lamps 63 respectively correspond.

In summary, according to the aforementioned preferred embodiment, the present invention has the following advantages.

1. The user may effectively control the on and off conditions of the electric lamp 63.

Regardless of whether the user controls the on and off conditions of the electric lamps 63 through the two-state switch keys 613 or through the command key units 623 of the remote switch base 62, the base microprocessor unit 611 may not only control the on and off conditions of the electric lamps 63 but also synchronously control the status indicators 614 of the two-state switch keys 613 such that indication by the status indicator 614 of each of the two-state switch keys 613 is consistent with the on or off condition of the corresponding one of the electric lamps 63. Accordingly, the mismatch predicament in the prior art may be avoided. Meanwhile, each of the command key units 623 of the remote switch handset 62 is directly provided with the ON key 624 and the OFF key 625 such that the user may directly operate the ON key 624 or the OFF key 625 for turning on or turning off the corresponding electric lamp 63 so as to achieve an effect of ease of control.

2. Setting up the matching relations is more flexible.

The user may select one of the one-to-one mode (long-strike) and the second one of the many-to-one mode s (double-short-strike) for matching establishment by means of the wall switch base 61 and the remote switch handset 62 making determinations according to the number and the duration of the trigger and ON signals. The user may also expand the matching relations associated with a previously-set one of the command key units 623 by means of performing the long-strike at any time such that the user may set the matching relations with more flexibility.

3. The intelligent switch apparatus 6 may be expanded with relative ease and enables personalization.

In this embodiment, the matching data is stored in the handset memory (M2) of the remote switch handset 62, and the remote switch handset 62 wirelessly transmits the control signal which indicates the matching relations such that the wall switch base 61 may control matched ones of the electric lamps 63 according to the control signal. In this way, the wall switch base 61 may be used in cooperation with multiple ones of the remote switch handsets 62, and each user may have in his/her possession an exclusive one of the remote switch handsets 62 for setting preferred matching relations.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A wireless intelligent lamp control method to be implemented by a wireless intelligent lamp control system, the wireless intelligent lamp control system including a wall switch base and a remote switch handset, the wall switch base including a plurality of two-state switch keys and a base microprocessor unit, the remote switch handset including a plurality of command key units and a handset microprocessor unit that includes a handset memory, each of the command key units including an ON key, the wireless intelligent lamp control method comprising:

(A) configuring the handset microprocessor unit to receive an ON signal set including at least one ON signal sent from the ON key of a user-selected one of the command key units, and to determine at least one of a number and a duration of the at least one ON signal in the ON signal set;

(B) configuring the handset microprocessor unit to transmit a wireless signal indicating the user-selected one of the command key units when the handset microprocessor unit determines that the ON signal set includes only one ON signal and the duration of the ON signal is longer than an ON threshold time;

(C) configuring the base microprocessor unit to receive a trigger signal set including at least one trigger signal sent from a user-selected one of the two-state switch keys, and to determine at least one of a number and a duration of the at least one trigger signal in the trigger signal set;

(D) configuring the base microprocessor unit to receive the wireless signal wirelessly transmitted by the handset microprocessor unit and indicating the user-selected one of the command key units, and to establish a matching relation between the user-selected one of the two-state switch keys and the user-selected one of the command key units when the base microprocessor unit determines that the trigger signal set includes only one trigger signal and the duration of the trigger signal is longer than a trigger threshold time;

(E) configuring the base microprocessor unit to wirelessly transmit the matching relation established in step (D); and (F) configuring the handset microprocessor unit to receive the matching relation wirelessly transmitted by the base microprocessor unit in step (E), and to store the matching relation in the handset memory.

2. The wireless intelligent lamp control method as claimed in claim 1, wherein each of the two-state switch keys includes a status indicator, the wireless intelligent lamp control method further comprising the following step after step (C):

configuring the base microprocessor unit to control the status indicator of the user-selected one of the two-state switch keys to indicate that the user-selected one of the two-state switch keys is undergoing matching.

3. The wireless intelligent lamp control method as claimed in claim 1, wherein the wall switch base further includes a plurality of switches each controllable to operate in a switch state, the base microprocessor unit including a base memory that stores corresponding relations between the two-state switch keys and the switches, and the switch state of each of the switches, each of the two-state switch keys including a status indicator, the wireless intelligent lamp control method further comprising the following step after step (F):

configuring the base microprocessor unit to control the status indicator of the user-selected one of the two-state switch keys to indicate the switch state of a corresponding one of the switches corresponding to the user-selected one of the two-state switch keys according to the corresponding relations and the switch states stored in the base memory.

4. The wireless intelligent lamp control method as claimed in claim 1, wherein the wall switch base further includes a plurality of switches each controllable to operate in a switch state, the base microprocessor unit including a base memory that stores corresponding relations between the two-state switch keys and the switches, and the switch state of each of the switches, each of the switch keys including a status indicator;

wherein, in step (C), the base microprocessor unit is further configured to determine an interval between two consecutive trigger signals in the trigger signal set;

wherein the wireless intelligent lamp control method further comprises:

(G) configuring the base microprocessor unit to control the status indicator of the user-selected one of the two-state switch keys to indicate that the user-selected one of the two-state switch keys is undergoing matching when the base microprocessor unit determines that the trigger signal set includes two consecutive trigger signals, that the duration of each of the two consecutive trigger signals is shorter than the trigger threshold time, and that the interval between the two consecutive trigger signals is shorter than a predetermined time interval in step (C);

(H) configuring the base microprocessor unit to determine whether another trigger signal set, which includes two consecutive trigger signals each having the duration shorter than the trigger threshold time and the interval between the two consecutive trigger signals being shorter than the predetermined time interval, is received from another user-selected one of the two-state switch keys, and if affirmative, configuring the base microprocessor unit to control the status indicator of said another user-selected one of the two-state switch keys to indicate that said another user-selected one of the two-state switch keys is undergoing matching;

(I) configuring the base microprocessor unit to receive the wireless signal wirelessly transmitted by the handset microprocessor unit and indicating the user-selected one of the command key units of the remote switch handset, and to establish the matching relation between the user-selected one of the command key units and each user-selected one of the two-state switch keys when the base microprocessor unit determines that said another trigger signal set is not received in step (H);

(J) configuring the base microprocessor unit to wirelessly transmit the matching relation established in step (I) to the handset microprocessor unit for storage in the handset memory; and (K) configuring the base microprocessor unit to control the status indicator of each user-selected one of the two-state switch keys to indicate the switch state of a corresponding one of the switches corresponding thereto according to the corresponding relations and the switch states stored in the base memory.

5. The wireless intelligent lamp control method as claimed in claim 1, wherein the wireless intelligent lamp control system further includes a plurality of electric lamps, the wall switch base further including a plurality of switches each controllable to operate in a switch state, each of the switches being configured to receive a direct current (DC) power signal and being coupled electrically to a corresponding one of the electric lamps, the base microprocessor unit including a base memory that stores corresponding relations between the two-state switch keys and the switches, and the switch state of each of the switches, each of the two-state switch keys including a status indicator, the wireless intelligent lamp control method further comprising:

configuring the base microprocessor unit to determine a corresponding one of the switches that corresponds to the user-selected one of the two-state switch keys according to the corresponding relations stored in the base memory, and to change the switch state of the corresponding one of the switches stored in the base memory when the base microprocessor unit determines that the trigger signal set includes only one trigger signal and that the duration of the trigger signal is shorter than the trigger threshold time in step (C);

configuring the base microprocessor unit to control the status indicator of the user-selected one of the two-state switch keys to indicate the switch state of the corresponding one of the switches stored in the base memory; and configuring the base microprocessor unit to control the corresponding one of the switches corresponding to the user-selected one of the two-state switch keys to operate according to the switch state stored in the base memory, such that when the switch state stored in the base memory is an ON state, the base microprocessor unit controls the corresponding one of the switches to operate in the ON state for allowing transmission of the DC power signal to the corresponding one of the electric lamps, and such that when the switch state stored in the base memory is an OFF state, the base microprocessor unit controls the corresponding one of the switches to operate in the OFF state for interrupting transmission of the DC power signal to the corresponding one of the electric lamps.

6. The wireless intelligent lamp control method as claimed in claim 1, wherein the wireless intelligent lamp control system further includes a plurality of electric lamps, the wall switch base further including a plurality of switches each controllable to operate in a switch state, each of the switches being configured to receive a direct current (DC) power signal and being coupled electrically to a corresponding one of the electric lamps, the base microprocessor unit including a base memory that stores corresponding relations between the two-state switch keys and the switches, and the switch state of each of the switches, each of the two-state switch keys including a status indicator, each of the command key units of the remote switch handset further including an OFF key operable to send an OFF signal, the wireless intelligent lamp control method further comprising:

configuring the base microprocessor unit to wirelessly receive from the handset microprocessor unit a control signal that indicates a signal sent from the user-selected one of the command key units of the remote switch handset and that indicates at least one of the two-state switch keys corresponding to the user-selected one of the command key units;

configuring the base microprocessor unit to determine at least one of the switches corresponding to the at least one of the two-state switch keys according to the control signal and the corresponding relations stored in the base memory, and to change the switch state of the at least one of the switches stored in the base memory according to the control signal, such that the switch state stored in the base memory and corresponding to the at least one of the switches is set to an ON state when the control signal indicates the signal sent from the user-selected one of the command key units is the ON signal, and is set to an OFF state when the control signal indicates the signal sent from the user-selected one of the command key units is the OFF signal;

configuring the base microprocessor unit to control the status indicator of the at least one of the two-state switch keys corresponding to the user-selected one of the command key units for indicating the switch state of the at least one of the switches, corresponding to the at least one of the two-state switch keys, stored in the base memory; and configuring the base microprocessor unit to control the at least one of the switches corresponding to the at least one of the two-state switch keys to operate according to the switch state stored in the base memory, such that when the switch state stored in the base memory is the ON state, the base microprocessor unit controls the at least one of the switches to operate in the ON state for allowing transmission of the DC power signal to the corresponding one of the electric lamps, and such that when the switch state stored in the base memory is the OFF state, the base microprocessor unit controls the at least one of the switches to operate in the OFF state for interrupting transmission of the DC power signal to the corresponding one of the electric lamps.

7. The wireless intelligent lamp control method as claimed in claim 1, wherein the wireless intelligent lamp control system further includes a plurality of electric lamps corresponding respectively to the two-state switch keys, the wall switch base further including a plurality of switches each controllable to operate in a switch state and being coupled electrically to a corresponding one of the electric lamps, the base microprocessor unit including a base memory that stores corresponding relations between the two-state switch keys and the switches, and the switch state of each of the switches, each of the two-state switch keys including a status indicator, the handset memory of the handset microprocessor unit storing matching data associated with the matching relations between the plurality of two-state switch keys and the plurality of command key units, the wireless intelligent lamp control method further comprising:

(M1) configuring the handset microprocessor unit to inspect the matching data stored in the handset memory for making a determination as to whether there is any matching relation associated with the user-selected one of the command key units when the handset microprocessor unit determines in step (A) that the ON signal set includes only one ON signal and the duration of the ON signal is shorter than the ON threshold time;

(M2) configuring the handset microprocessor unit to wirelessly transmit a control signal that indicates the ON signal sent from the user-selected one of the command key units of the remote switch handset and that indicates at least one of the two-state switch keys corresponding to the user-selected one of the command key units according to the matching relations when a result of the determination made in step (M1) is affirmative;

(M3) configuring the base microprocessor unit to receive the control signal wirelessly transmitted by the handset microprocessor unit, to determine at least one of the switches corresponding to the at least one of the two-state switch keys according to the control signal and the corresponding relations stored in the base memory, and to set the switch state of the at least one of the switches stored in the base memory to an ON state according to the control signal;

(M4) configuring the base microprocessor unit to control the status indicator of the at least one of the two-state switch keys for indicating the switch state of the at least one of the switches, corresponding to the at least one of the two-state switch keys, stored in the base memory; and (M5) configuring the base microprocessor unit to control the at least one of the switches to operate according to the switch state stored in the base memory so as to turn on the electric lamp corresponding to the user-selected one of the command key units.

8. A wireless intelligent lamp control system comprising an intelligent switch apparatus that includes:
  a remote switch handset including:
    a plurality of command key units, each of said command key units including an ON key, said ON key of a user-selected one of said command key units being operable to send an ON signal set that includes at least one ON signal; and
    a handset microprocessor unit that includes a handset memory and that is coupled electrically to each of said command key units, said handset microprocessor unit being configured
      to receive the ON signal set including the at least one ON signal sent from said ON key of the user-selected one of said command key units, and to determine at least one of a number and a duration of the at least one ON signal in the ON signal set, and
      to transmit a wireless signal indicating the user-selected one of said command key units when the handset microprocessor unit determines that the ON signal set includes only one ON signal and the duration of the ON signal is longer than an ON threshold time; and
  a wall switch base including:
    a plurality of two-state switch keys, a user-selected one of said two-state switch keys being operable to send a trigger signal set that includes
  at least one trigger signal; and
    a base microprocessor unit coupled electrically to each of said two-state switch keys, said base microprocessor unit being configured
      to receive the trigger signal set including the at least one trigger signal sent from the user-selected one of said two-state switch keys, and to determine at least one of a number and a duration of the at least one trigger signal in the trigger signal set,
      to receive the wireless signal wirelessly transmitted by said handset microprocessor unit and indicating the user-selected one of said command key units, and to establish a matching relation between the user-selected one of said two-state switch keys and the user-selected one of said command key units when said base microprocessor unit determines that the trigger signal set includes only one trigger signal and the duration of the trigger signal is longer than a trigger threshold time, and
      to wirelessly transmit the matching relation;
  wherein said handset microprocessor unit is further configured to receive the matching relation wirelessly transmitted by said base microprocessor unit, and to store the matching relation in said handset memory.

9. The wireless intelligent lamp control system as claimed in claim 8, further comprising a plurality of electric lamps, said wall switch base further including a plurality of switches each controllable to operate in a switch state, each of said switches being configured to receive a direct current (DC) power signal and being coupled electrically to a corresponding one of said electric lamps, said base microprocessor unit including a base memory that stores corresponding relations between said two-state switch keys and said switches, and the switch state of each of said switches, each of said two-state switch keys including a status indicator;
  wherein said base microprocessor unit is further configured:
    to determine a corresponding one of said switches that corresponds to the user-selected one of said switch keys according to the corresponding relations stored in said base memory, and to change the switch state of the corresponding one of said switches stored in said base memory when said base microprocessor unit determines that the trigger signal set includes only one trigger signal and that the duration of the trigger signal is shorter than the trigger threshold time;
    to control said status indicator of the user-selected one of said two-state switch keys to indicate the switch state of the corresponding one of said switches stored in said base memory; and
    to control the corresponding one of said switches corresponding to the user-selected one of said two-state switch keys to operate according to the switch state stored in said base memory, such that when the switch state stored in said base memory is an ON state, said base microprocessor unit controls the corresponding one of said switches to operate in the ON state for allowing transmission of the DC power signal to the corresponding one of said electric lamps, and such that when the switch state stored in said base memory is an OFF state, said base microprocessor unit controls the corresponding one of said switches to operate in the OFF state for interrupting transmission of the DC power signal to the corresponding one of said electric lamps.

10. The wireless control system as claimed in claim 9,
wherein each of said status indicators includes a light-emitting diode (LED);
wherein said base microprocessor unit turns off said LED of said status indicator of the user-selected one of said two-state switch keys when the switch state of the corresponding one of said switches stored in said base memory is the ON state, and turns on said LED of said status indicator of the user-selected one of said two-state switch keys when the switch state of the corresponding one of said switches stored in said base memory is the OFF state.

11. The wireless intelligent lamp control system as claimed in claim 8, wherein said remote switch handset further includes a battery that is coupled electrically to said handset microprocessor unit and that provides electric power thereto.

12. A wireless intelligent lamp control method to be implemented by a wall switch base for wireless communication with a remote switch handset, the wall switch base including a plurality of two-state switch keys and a base microprocessor unit, the remote switch handset including a plurality of command key units and a handset microprocessor unit, the handset microprocessor unit being configured to transmit a wireless signal indicating a user-selected one of the command key units of the remote switch handset, the wireless intelligent lamp control method comprising:
(A) configuring the base microprocessor unit to receive a trigger signal set including at least one trigger signal sent from a user-selected one of the two-state switch keys, and to determine at least one of a number and a duration of the at least one trigger signal in the trigger signal set;
(B) configuring the base microprocessor unit to receive the wireless signal wirelessly transmitted by the handset microprocessor unit and indicating the user-selected one of the command key units, and to establish a matching relation between the user-selected one of the two-state switch keys and the user-selected one of the command key units when the base microprocessor unit determines that the trigger signal set includes only one trigger signal and the duration of the trigger signal is longer than a trigger threshold time; and
(C) configuring the base microprocessor unit to wirelessly transmit the matching relation to the handset microprocessor unit.

13. The wireless intelligent lamp control method as claimed in claim 12, where each of the two-state switch keys includes a status indicator, the wireless intelligent lamp control method further comprising the following step after step (A):
configuring the base microprocessor unit to control the status indicator of the user-selected one of the two-state switch keys to indicate that the user-selected one of the two-state switch keys is undergoing matching.

14. The wireless intelligent lamp control method as claimed in claim 12, wherein the wall switch base further includes a plurality of switches each controllable to operate in a switch state, the base microprocessor unit including a base memory that stores corresponding relations between the two-state switch keys and the switches, and the switch state of each of the switches, each of the two-state switch keys including a status indicator, the wireless intelligent lamp control method further comprising the following step after step (C):
configuring the base microprocessor unit to control the status indicator of the user-selected one of the two-state switch keys to indicate the switch state of a corresponding one of the switches corresponding to the user-selected one of the two-state switch keys according to the corresponding relations and the switch states stored in the base memory.

15. The wireless intelligent lamp control method as claimed in claim 12,
wherein the wall switch base further includes a plurality of switches each controllable to operate in a switch state, the base microprocessor unit including a base memory that stores corresponding relations between the two-state switch keys and the switches, and the switch state of each of the switches, each of the switch keys including a status indicator;
wherein, in step (A), the base microprocessor unit is further configured to determine an interval between two consecutive trigger signals in the trigger signal set;
wherein the wireless intelligent lamp control method further comprises:
(D) configuring the base microprocessor unit to control the status indicator of the user-selected one of the two-state switch keys to indicate that the user-selected one of the two-state switch keys is undergoing matching when the base microprocessor unit determines that the trigger signal set includes two consecutive trigger signals, that the duration of each of the two consecutive trigger signals is shorter than the trigger threshold time, and that the interval between the two consecutive trigger signals is shorter than a predetermined time interval in step (A);
(E) configuring the base microprocessor unit to determine whether another trigger signal set, which includes two consecutive trigger signals each having the duration shorter than the trigger threshold time and the interval between the two consecutive trigger signals being shorter than the predetermined time interval, is received from another user-selected one of the two-state switch keys, and if affirmative, configuring the base microprocessor unit to control the status indicator of said another user-selected one of the two-state switch keys to indicate that said another user-selected one of the two-state switch keys is undergoing matching;
(F) configuring the base microprocessor unit to receive the wireless signal wirelessly transmitted by the handset microprocessor unit and indicating the user-selected one of the command key units of the remote switch handset, and to establish the matching relation between the user-selected one of the command key units and each user-selected one of the two-state switch keys when the base microprocessor unit determines that said another trigger signal set is not received in step (E);
(G) configuring the base microprocessor unit to wirelessly transmit the matching relation established in step (F) to the handset microprocessor unit; and
(H) configuring the base microprocessor unit to control the status indicator of each user-selected one of the two-state switch keys to indicate the switch state of a corresponding one of the switches corresponding thereto according to the corresponding relations and the switch states stored in the base memory.

16. The wireless intelligent lamp control method as claimed in claim 12, wherein the wall switch base is coupled electrically to a plurality of electric lamps, the wall switch base further including a plurality of switches each controllable to operate in a switch state, each of the switches being configured to receive a direct current (DC) power signal and being coupled electrically to a corresponding one of the electric lamps, the base microprocessor unit including a base memory that stores corresponding relations between the two-state switch keys and the switches, and the switch state of each of the switches, each of the two-state switch keys including a status indicator, the wireless intelligent lamp control method further comprising:

configuring the base microprocessor unit to determine a corresponding one of the switches that corresponds to the user-selected one of the two-state switch keys according to the corresponding relations stored in the base memory, and to change the switch state of the corresponding one of the switches stored in the base memory when the base microprocessor unit determines that the trigger signal set includes only one trigger signal and that the duration of the trigger signal is shorter than the trigger threshold time in step (A);

configuring the base microprocessor unit to control the status indicator of the user-selected one of the two-state switch keys to indicate the switch state of the corresponding one of the switches stored in the base memory; and configuring the base microprocessor unit to control the corresponding one of the switches corresponding to the user-selected one of the two-state switch keys to operate according to the switch state stored in the base memory, such that when the switch state stored in the base memory is an ON state, the base microprocessor unit controls the corresponding one of the switches to operate in the ON state for allowing transmission of the DC power signal to the corresponding one of the electric lamps, and such that when the switch state stored in the base memory is an OFF state, the base microprocessor unit controls the corresponding one of the switches to operate in the OFF state for interrupting transmission of the DC power signal to the corresponding one of the electric lamps.

17. The wireless intelligent lamp control method as claimed in claim 12, wherein the wall switch base is coupled electrically to a plurality of electric lamps, the wall switch base further including a plurality of switches each controllable to operate in a switch state, each of the switches being configured to receive a direct current (DC) power signal and being coupled electrically to a corresponding one of the electric lamps, the base microprocessor unit including a base memory that stores corresponding relations between the two-state switch keys and the switches, and the switch state of each of the switches, each of the two-state switch keys including a status indicator, each of the command key units of the remote switch handset including an ON key operable to send an ON signal, and an OFF key operable to send an OFF signal, the wireless intelligent lamp control method further comprising:

configuring the base microprocessor unit to wirelessly receive from the handset microprocessor unit a control signal that indicates a signal sent from the user-selected one of the command key units of the remote switch handset and that indicates at least one of the two-state switch keys corresponding to the user-selected one of the command key units;

configuring the base microprocessor unit to determine at least one of the switches corresponding to the at least one of the two-state switch keys according to the control signal and the corresponding relations stored in the base memory, and to change the switch state of the at least one of the switches stored in the base memory according to the control signal, wherein the base microprocessor unit sets the switch state stored in the base memory and corresponding to the at least one of the switches to an ON state when the control signal indicates the signal sent from the user-selected one of the command key units is the ON signal, and sets the switch state stored in the base memory and corresponding to the at least one of the switches to an OFF state when the control signal indicates the signal sent from the user-selected one of the command key units is the OFF signal;

configuring the base microprocessor unit to control the status indicator of the at least one of the two-state switch keys corresponding to the user-selected one of the command key units for indicating the switch state of the at least one of the switches, corresponding to the at least one of the two-state switch keys, stored in the base memory; and configuring the base microprocessor unit to control the at least one of the switches corresponding to the at least one of the two-state switch keys to operate according to the switch state stored in the base memory, such that when the switch state stored in the base memory is the ON state, the base microprocessor unit controls the at least one of the switches to operate in the ON state for allowing transmission of the DC power signal to the corresponding one of the electric lamps, and such that when the switch state stored in the base memory is the OFF state, the base microprocessor unit controls the at least one of the switches to operate in the OFF state for interrupting transmission of the DC power signal to the corresponding one of the electric lamps.

18. A wall switch base adapted for wireless communication with a remote switch handset, the remote switch handset including a plurality of command key units and a handset microprocessor unit, the handset microprocessor unit being configured to transmit a wireless signal indicating a user-selected one of the command key units of the remote switch handset, said wall switch base comprising:

a plurality of two-state switch keys, a user-selected one of said two-state switch keys being operable to send a trigger signal set that includes at least one trigger signal; and a base microprocessor unit coupled electrically to each of said two-state switch keys, said base microprocessor unit being configured to receive the trigger signal set including the at least one trigger signal sent from the user-selected one of said two-state switch keys, and to determine at least one of a number and a duration of the at least one trigger signal in the trigger signal set;

to receive the wireless signal wirelessly transmitted by the handset microprocessor unit and indicating the user-selected one of the command key units, and to establish a matching relation between the user-selected one of said two-state switch keys and the user-selected one of the command key units when said base microprocessor unit determines that the trigger signal set includes only one trigger signal and the duration of the trigger signal is longer than a trigger threshold time; and to wirelessly transmit the matching relation to the handset microprocessor unit.

19. The wall switch base as claimed in claim 18, further comprising a plurality of switches each controllable to operate in a switch state, each of said switches being configured to receive a direct current (DC) power signal and being adapted to be coupled electrically to a corresponding electric lamp, said base microprocessor unit including a base memory that stores corresponding relations between said two-state switch keys and said switches, and the switch state of each of said switches, each of said two-state switch keys including a status indicator;

wherein said base microprocessor unit is further configured:

to determine a corresponding one of said switches that corresponds to the user-selected one of said switch keys according to the corresponding relations stored in said base memory, and to change the switch state of the corresponding one of said switches stored in said base memory when said base microprocessor unit determines that the trigger signal set includes only one trigger signal and that the duration of the trigger signal is shorter than the trigger threshold time;

to control said status indicator of the user-selected one of said two-state switch keys to indicate the switch state of the corresponding one of said switches stored in said base memory; and to control the corresponding one of said switches corresponding to the user-selected one of said two-state switch keys to operate according to the switch state stored in said base memory, such that when the switch state stored in said base memory is an ON state, said base microprocessor unit controls the corresponding one of said switches to operate in the ON state for allowing transmission of the DC power signal to the corresponding electric lamp, and such that when the switch state stored in said base memory is an OFF state, said base microprocessor unit controls the corresponding one of said switches to operate in the OFF state for interrupting transmission of the DC power signal to the corresponding electric lamp.

20. The wall switch base as claimed in claim 19, wherein each of said status indicators includes a light-emitting diode (LED);

wherein said base microprocessor unit turns off said LED of said status indicator of the user-selected one of said two-state switch keys when the switch state of the corresponding one of said switches stored in said base memory is the ON state, and turns on said LED of said status indicator of the user-selected one of said two-state switch keys when the switch state of the corresponding one of said switches stored in said base memory is the OFF state.

21. A wireless intelligent lamp control method to be implemented by a remote switch handset for wireless communication with a wall switch base, the remote switch handset including a plurality of command key units and a handset microprocessor unit that includes a handset memory, each of the command key units including an ON key, the wall switch base including a plurality of two-state switch keys and a base microprocessor unit, the wireless intelligent lamp control method comprising:

(A) configuring the handset microprocessor unit to receive an ON signal set including at least one ON signal sent from the ON key of a user-selected one of the command key units, and to determine at least one of a number and a duration of the at least one ON signal in the ON signal set;

(B) configuring the handset microprocessor unit to transmit a wireless signal indicating the user-selected one of the command key units to the base microprocessor unit for enabling the base microprocessor unit to establish a matching relation between a user-selected one of the two-state switch keys and the user-selected one of the command key units when the handset microprocessor unit determines that the ON signal set includes only one ON signal and the duration of the ON signal is longer than an ON threshold time; and (C) configuring the handset microprocessor unit to wirelessly receive the matching relation from the base microprocessor unit, and to store the matching relation in the handset memory.

22. The wireless intelligent lamp control method as claimed in claim 21, wherein the wall switch base is coupled electrically to a plurality of electric lamps corresponding respectively to the two-state switch keys, the handset memory of the handset microprocessor unit storing matching data associated with the matching relations between the plurality of two-state switch keys and the plurality of command key units, the wireless intelligent lamp control method further comprising:

(D1) configuring the handset microprocessor unit to inspect the matching data stored in the handset memory for making a determination as to whether there is any matching relation associated with the user-selected one of the command key units when the handset microprocessor unit determines in step (A) that the ON signal set includes only one ON signal and the duration of the ON signal is shorter than the ON threshold time; and (D2) configuring the handset microprocessor unit to wirelessly transmit a control signal that indicates the ON signal sent from the user-selected one of the command key units of the remote switch handset and that indicates at least one of the two-state switch keys corresponding to the user-selected one of the command key units according to the matching relations when a result of the determination made in step (D1) is affirmative, such that the base microprocessor unit is able to turn on the electric lamp corresponding to the user-selected one of the command key units upon receipt of the control signal.

23. A remote switch handset adapted for wireless communication with a wall switch base, the wall switch base including a plurality of two-state switch keys and a base microprocessor unit, said remote switch handset comprising:

a plurality of command key units each including an ON key, s aid ON key of a user-selected one of said command key units being operable to send an ON signal set that includes at least one ON signal; and a handset microprocessor unit including a handset memory, and coupled electrically to each of said command key units, said handset microprocessor unit being configured to receive the ON signal set including the at least one ON signal sent from said ON key of the user-selected one of said command key units, and to determine at least one of a number and a duration of the at least one ON signal in the ON signal set;

to transmit a wireless signal indicating the user-selected one of said command key units to the base microprocessor unit for enabling the base microprocessor unit to establish a matching relation between a user-selected one of the two-state switch keys and the user-selected one of said command key units when said handset microprocessor unit determines that the ON signal set includes only one ON signal and the duration of the ON signal is longer than an ON threshold time; and to wirelessly receive the matching relation from the base microprocessor unit, and to store the matching relation in said handset memory.

24. The remote switch handset as claimed in claim 23, further comprising a battery that is coupled electrically to said handset microprocessor unit and that provides electric power thereto.

25. The remote switch handset as claimed in claim 23, the wall switch base being coupled electrically to a plurality of electric lamps corresponding respectively to the two-state switch keys, wherein each of said command key units of said remote switch handset further includes an OFF key operable to send an OFF signal, said handset memory of said handset microprocessor unit storing matching data associated with the matching relations between the plurality of two-state switch keys and said plurality of command key units, said handset microprocessor unit being further configured:

to receive the OFF signal from said OFF key of the user-selected one of said command key units, and to determine whether a duration of the OFF signal is longer than an OFF threshold time;

to erase part of the matching data, which corresponds to the matching relation associated with the user-selected one of said command key units, stored in said handset memory when said handset microprocessor unit determines that the duration of the OFF signal is longer than the OFF threshold time;

to inspect the matching data stored in the handset memory for making a determination as to whether there is any matching relation associated with the user-selected one of said command key units when said handset microprocessor unit determines that the duration of the OFF signal is shorter than the OFF threshold time; said to wirelessly transmit a control signal that indicates the OFF signal sent from the user-selected one of said command key units of said remote switch handset and that indicates at least one of the two-state switch keys corresponding to the user-selected one of said command key units according to the matching relations when a result of the determination is affirmative, such that the base microprocessor unit is able to turn off the electric lamp corresponding to said user-selected one of the command key units upon receipt of the control signal.

\* \* \* \* \*